United States Patent
Nakabe et al.

(10) Patent No.: US 7,303,135 B2
(45) Date of Patent: Dec. 4, 2007

(54) SEMICONDUCTOR MEMORY CARD AND COMPUTER READABLE PROGRAM

(75) Inventors: Futoshi Nakabe, Hiroshima (JP); Shinji Kawano, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 476 days.

(21) Appl. No.: 10/512,149

(22) PCT Filed: Feb. 4, 2004

(86) PCT No.: PCT/JP2004/001144

§ 371 (c)(1),
(2), (4) Date: Oct. 22, 2004

(87) PCT Pub. No.: WO2004/070728

PCT Pub. Date: Aug. 19, 2004

(65) Prior Publication Data

US 2005/0226072 A1  Oct. 13, 2005

(30) Foreign Application Priority Data

Feb. 4, 2003 (JP) .......................... 2003-027683

(51) Int. Cl.
*G06K 19/06* (2006.01)
(52) U.S. Cl. ..................... 235/492; 235/380

(58) Field of Classification Search ............ 235/380, 235/492; 705/64, 65; 711/155, 159
See application file for complete search history.

(56) References Cited

U.S. PATENT DOCUMENTS

| | | | |
|---|---|---|---|
| 4,960,982 A * | 10/1990 | Takahira | ............... 235/382 |
| 5,479,638 A | 12/1995 | Assar et al. | |
| 6,275,804 B1 | 8/2001 | Carl et al. | |
| 6,507,911 B1 | 1/2003 | Langford | |
| 6,513,719 B1 * | 2/2003 | Imura | ............... 235/492 |
| 6,718,314 B2 * | 4/2004 | Chaum et al. | ............... 705/64 |
| 6,899,270 B2 * | 5/2005 | Obayashi et al. | ............ 235/451 |
| 7,097,107 B1 * | 8/2006 | Guthery | ............... 235/492 |

FOREIGN PATENT DOCUMENTS

| | | |
|---|---|---|
| JP | 2001-188701 | 7/2001 |
| JP | 3389186 | 1/2003 |
| WO | 00/65602 | 11/2000 |
| WO | 01/29670 | 4/2001 |

* cited by examiner

*Primary Examiner*—Michael G. Lee
*Assistant Examiner*—Kumiko C. Koyama
(74) *Attorney, Agent, or Firm*—Wenderoth, Lind & Ponack, L.L.P.

(57) ABSTRACT

The present invention provides a semiconductor memory card which no longer allows an illegal practice of acquiring contents of a deleted file. Here, when a deletion event is generated, a deletion handler gives a priority to a null-clear operation of a file entry and a FAT for a file to be deleted over a null-clear operation to other constituents of the file. A null-clear operation to a file entity of the file is distributed to a plurality of event handlers including the deletion handler.

12 Claims, 28 Drawing Sheets

FIG. 20

FIG. 21
AFTER OVERWRITING BY NOT-COMMAND-EXECUTING HANDLER AND READING/WRITING HANDLER

ROOT DIRECTORY ENTRY

| FILE NAME | FILE EXTENSION | FIRST CLUSTER NUMBER |
|---|---|---|
| NULL | NULL | NULL |

FAT ENTRY 002-006

| reserved | FAT ENTRY 002 (007) | FAT ENTRY 003 (NULL) | FAT ENTRY 004 (NULL) | FAT ENTRY 005 (NULL) | FAT ENTRY 006 |

CLUSTER 002-006

| CLUSTER 002 | CLUSTER 003 (NULL) | CLUSTER 004 (NULL) | CLUSTER 005 (NULL) | CLUSTER 006 |

FAT ENTRY 007-00D

| FAT ENTRY 007 | FAT ENTRY 008 | FAT ENTRY 009 | FAT ENTRY 00A (NULL) | FAT ENTRY 00B | FAT ENTRY 00C (NULL) | FAT ENTRY 00D |

CLUSTER 007-00D

| CLUSTER 007 | CLUSTER 008 | CLUSTER 009 | CLUSTER 00A (NULL) | CLUSTER 00B | CLUSTER 00C (NULL) | CLUSTER 00D |

FIG. 26

COMPARISON OF PERFORMANCE

| | PRICE | STORING LARGE CAPACITY DATA | UNIT OF WRITING | TIME REQUIRED FOR WRITING | NUMBER OF POSSIBLE WRITING OPERATIONS | WRITING PERFORMANCE | TIME REQUIRED FOR READING | READING METHOD | POWER CONSUMPTION |
|---|---|---|---|---|---|---|---|---|---|
| Flash | LOW | ○ | BLOCK ※1 | 10000ns | $10^6$ | UNSTABLE ※2 | 50ns | NON-DESTRUCTIVE | ○ |
| FeRAM | HIGH | △ | 1byte ※3 | 30~100ns | $10^{12}$~16 | STABLE | 30~100ns | DESTRUCTIVE ※4 | ◎ |

FIG.27

FeRAM

- DOUBLE FAT
- FILE ENTRY
- FILE ENTRY
- FILE ENTRY
- FILE ENTRY
- CLEAR OPERATION MANAGEMENT TABLE

SEMICONDUCTOR MEMORY CARD AND COMPUTER READABLE PROGRAM

TECHNICAL FIELD

The present invention relates to a semiconductor memory card that can store data in files, in particular to a file deleting technique.

BACKGROUND ART

Semiconductor memory cards such as an IC card and an SD memory card have been experimentally introduced to various industries extending from mass media including broadcast and publishing industries to financial institutions, and governmental and local organizations. The semiconductor memory cards have caused a sensation in these industries because of their enormous convenience. In a semiconductor memory card, data is managed in a layer model having a physical layer, a file system layer, and an application layer. Therefore, a user can create a file on a semiconductor memory card, and delete the created file in the same procedure as deleting a file stored on a computer.

Deletion of a file on a conventional semiconductor memory card only involves overwriting of management information, which includes a file allocation table (FAT) showing link relations between file fragments and a file entry. The reason for this is mentioned in the following. If management information for a file is overwritten, locations of fragments constituting a file entity on a semiconductor memory card are lost and link relations between fragments discontinuously located on a semiconductor memory card are broken. This makes reading of the file impossible.

Data management by a file system on a conventional semiconductor memory card is described in unexamined Japanese patent publication No. 2001-188701, U.S. Pat. No. 5,479,638 and Japanese patent No. 3389186.

According to the above-mentioned method for file deletion, a FAT and a file entry are overwritten. However, a file entity of a deleted file and fragments constituting the file entity still remain, discontinuously though, on a semiconductor memory card. If such a deleted file contains data concerning money transactions, there is a danger that bank account numbers and ATM card numbers are read from discrete fragments.

Furthermore, a third person can regenerate a deleted file by tracing discontinuous fragments on a semiconductor memory card, to acquire the contents of the file that should have been deleted.

However, there is a reason why file deletion only involves overwriting of management information such as an FAT and a file entry. It is because of a processing time required for overwriting. According to a trial calculation, it takes 2 milliseconds to overwrite 512 bytes. 4 seconds for 1 megabyte, and 40 seconds for 10 megabytes. This indicates that it takes time to perform a complete deletion operation, that is to say, to overwrite a file entity of a file so as to make reading of the file totally impossible. Moreover, such a complete deletion operation poses a problem of where data indicating locations of fragments constituting a deleted file should be stored. If data indicating locations of fragments, as well as the fragments, is stored in a nonvolatile memory, a third person can possibly read the locations of the fragments before a complete deletion operation is accomplished. Therefore, information about a file to be deleted is not sifliciently protected while a complete deletion operation is performed.

SUMMARY OF THE INVENTION

It is an object of the present invention to provide a semiconductor memory card which is capable of protecting a file entity of a file to be deleted from when deletion of the file is instructed to when the file is completely deleted.

The object can be achieved by a semiconductor memory card comprising a nonvolatile memory that stores a file constituted by an entity and management information, and a tamper-resistant module that includes a processing unit and an internal memory. The processing unit includes a deletion unit operable to, if a deletion event for the file is generated, (i) create a location table on the internal memory in the tamper-resistant module, and (ii) overwrite the management information, wherein the location table indicates a location of the entity, and is referred to by the deletion unit when the deletion unit overwrites the entity.

A file entity of a file is overwritten with reference to a location table stored in a memory in a tamper-resistant module. Therefore, information regarding fragments can be sufficiently protected from when a deletion event is generated to when the file is completely deleted.

A file entity is overwritten with reference to a location table in an idle time after the deletion event is generated. In this way, a processing load of file entity overwriting is divided so as to be performed in a plurality of units of an idle time. Because of the division, the semiconductor memory card is able to go back to a standby status sooner, enabling overwriting of a file entity to be completed without making a user feel that file deletion takes a long time.

In addition, overwriting of file management information, which breaks the link relations between fragments constitutina a file, is given a priority over overwriting of a file entityy. Since the overwriting operations are performed in the above-mentioned order, a reverse analysis of fragments becomes more difficult as time elapses.

Here, the processing unit (i) performs an operation corresponding to a command that is issued by a device to which the semiconductor memory card is connected, and (ii) further includes an analysis unit operable to analyze the command that is issued by the device and generate an event corresponding to a result of the analysis. Also, the deletion unit includes a main deletion unit operable to, if the deletion event is generated, create the location table and overwrite the management information, and a sub deletion unit operable to, if an event different from the deletion event is generated, overwrite the entity with reference to the created location table.

Here, the semiconductor memory card further comprises a timer operable to start measuring a time when the deletion event is generated. The main deletion unit overwrites one part of the entity, in addition to the management information, until the timer tells a time-out, and the sub deletion unit overwrites a remaining part of the entity that has not been overwritten by the main deletion unit. Thus, an overwriting operation in response to an instruction of file deletion is continued until a time-out. Accordingly, if a time-out period is adjusted based on, for example, a time period required for an overwriting operation for a nonvolatile memory, a waiting time for a user can be optimized.

Here, the internal memory stores an encryption key with which the entity has been encrypted, and when the deletion event is generated, the main deletion unit overwrites the encryption key before overwriting the management information of the file. Overwriting of the encryption key is given a priority over overwriting of a file entity. Thus, it becomes impossible to decrypt the file. As the overwriting operations are performed in the above-mentioned order, the reverse analysis of fragments becomes more difficult as time elapses.

Here, the semiconductor memory card operates by means of either contact or contactless power supply from a device, but the processing unit performs the overwriting only when the semiconductor memory card operates by means of the contact power supply from the device. As a result, during contactless power supply, overwriting of a file entity is not performed. This enables a stable operation to be realized.

BRIEF DESCRIPTION OF THE DRAWINGS

FIG. 20 illustrates an operation of the deletion handler 16 when a deletion event is generated to a file stored as described in FIG. 10.

FIG. 21 illustrates an overwriting operation by the not-command-executing handler 12 and the deletion handler 16.

FIG. 26 compares performance of a flash memory and that of an FeRAM.

FIG. 27 illustrates an FeRAM storing frequently-updated data such as a file entry, a FAT, and a clear operation management table.

BEST MODE FOR CARRYING OUT THE INVENTION

The following describes embodiments of a semiconductor memory card of the present invention. A semiconductor memory card relating to a first embodiment is an SDeX memory card which has a built-in tamper-resistant module of an IC card. An SDeX memory card is, similarly to an SD memory card, used as a storage medium for an SD portable device, and has a built-in tamper-resistant module of an IC card. In addition, the SDeX memory card 400 relating to the first embodiment (in FIG. 1) can communicate with an external device in both contact and contactless communication modes.

Figure 1:
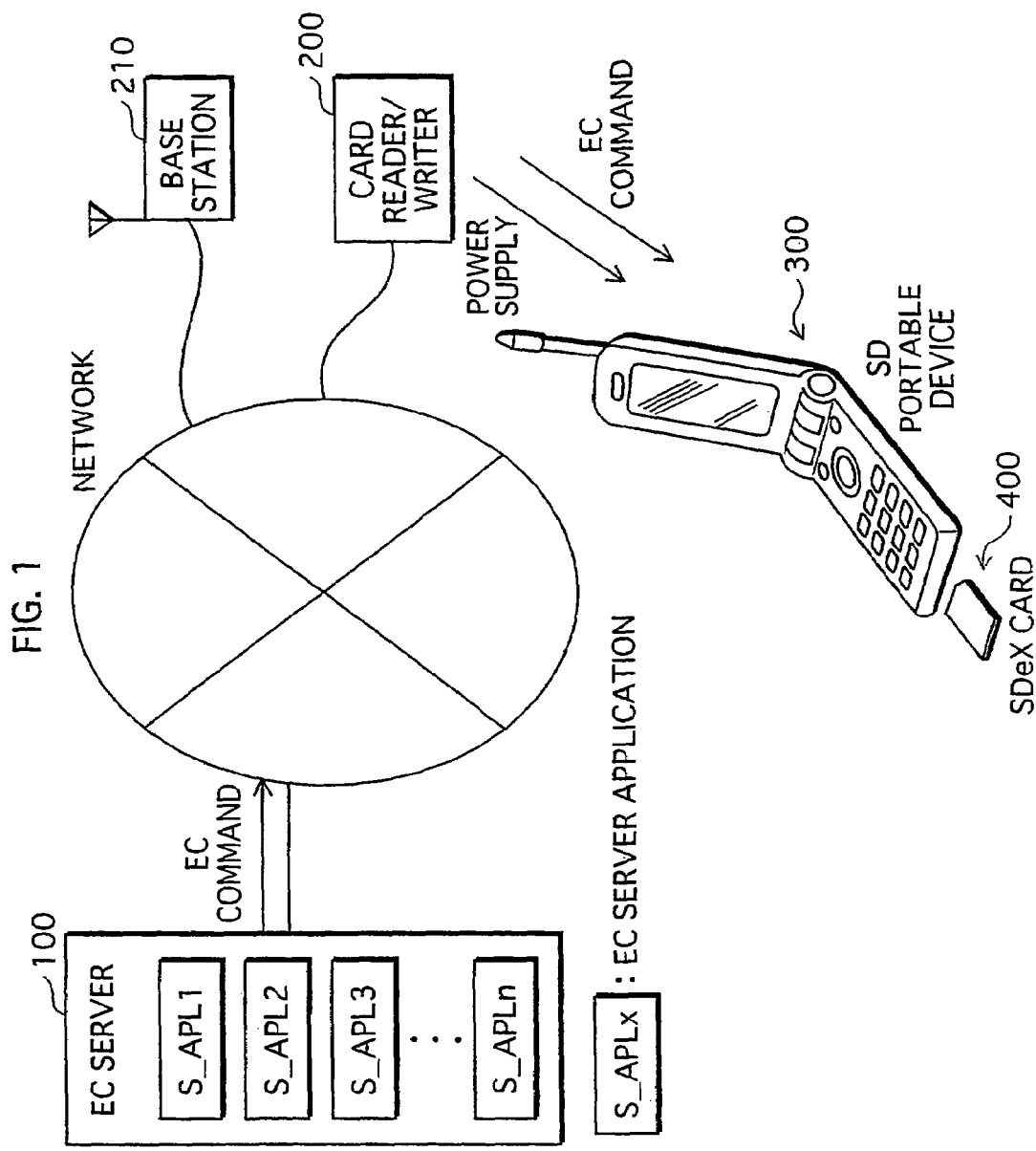
FIG. 1 illustrates an environment in which an SDeX memory card 400 is used.

First of all, it is described how the semiconductor memory card according to the present invention (SDeX memory card 400) is used. The SDeX memory card 400 is connected to an SD portable device such as mobile telephones, and used in an environment illustrated in FIG. 1. FIG. 1 illustrates an environment in which the SDeX memory card 400 is used.

The environment illustrated in FIG. 1 includes an electronic commerce (EC) server 100, a card reader/writer 200, a radio base station 210, and an SD portable device 300.

The EC server 100 provides an EC service to the SDeX memory card 400 card through the card reader/writer 200 and the radio base station 210 and a network. Multiple EC application programs operate on the EC server 100, and each of the application programs provides a unique EC service to the SDeX memory card 400. EC applications operating on the EC server 100 are server applications, and each of them provides a different EC service. In FIG. 1, EC server applications for n kinds of EC services are briefly expressed as S_APL 1, 2, 3 . . . n respectively. Here, there are n kinds of server applications. The EC server 100 provides an EC service, by issuing an EC command to the SDeX memory card 400 through the network, the card reader/writer 200 and the radio base station 210.

The card reader/writer 200 is, for example, a device included in cash dispensers of credit card companies and financial institutions or cash registers at shops. The card reader/writer 200 supplies power to the SDeX memory card 400 and performs contactless input/output with the SDeX memory card 400. The card reader/writer 200 is connected to the network. Through the card reader/writer 200, the SDeX memory card 400 receives EC services provided by the EC server 100.

The radio base station 210 is disposed at the top of buildings and telegraph poles. The radio base station 210 performs data input/output by air with the SD portable device 300 of a mobile telephone type. The radio base station 210 is connected to the network. Through the radio base station 210, the SD portable device 300 also receives EC services provided by the EC-server 100.

The SD portable device 300 gains access to the SDeX memory card 400 in such a manner that the SDeX memory card 400 is connected to the SD portable device 300. Browser software or the like is installed in the SD portable device 300, so that a user gains access to a file system (hereinafter referred to as FS) of the SDeX memory card 400 through a user interface of the browser. Such file-system access is performed in such a manner that the SD portable device 300 issues an SD command defined by an SD memory card to the SDeX memory card 400 and receives a response for the command from the SDeX memory card 400. When the SD portable device 300 bootstraps the SDeX memory card 400, the SDeX memory card 400 is integrated into the SD portable device 300 so as to function as an IC card. Here, a helical antenna is buried in the back surface of the SD portable device 300. When the SD portable device 300 functions as an IC card, the helical antenna supplies power from the card reader/writer 200 to the SDeX memory card 400. In addition, the SD portable device 300 exchanges command/response to/from the SDeX memory card 400 and command/response from/to the EC server 100. To be specific, the SD portable device 300 encapsulates an EC command from the EC server 100 to generate an extended SD command, and outputs the extended SD command to the SDeX memory card 400. Furthermore, the SD portable device 300 obtains an EC response from an SD response from the SDeX memory card 400, and outputs the EC response to the EC server 100. When the SD portable device 300 bootstraps the SDeX memory card 400 so as that they function as an IC card, they are in an "EC mode". When the SD portable device 300 uses the SDeX memory card 400 as a storage medium, they are in an "SD mode".

When the SDeX memory card 400 is in the SD mode, it is used as an SD memory card. In the SD mode, the SD portable device 300 is the host device of the SDeX memory card 400. The SDeX memory card 400 is used for storing audio and video data downloaded to the SD portable device 300 from distribution servers in this case. Thus, the host device can playback the audio and video data, which is stored in the SDeX memory card 400.

In the EC mode, the SDeX memory card 400 is used as an IC card. The SDeX memory card 400 is connected to the SD portable device 300 in the EC mode too. However, the host device of the SDeX memory card 400 is not the SD portable device 300, but the EC server 100 on the network. The SDeX memory card 400 communicates with the EC server 100 by means of the SD portable device 300 to which the SDeX memory card 400 is connected together with the card reader/writer 200 and the radio base station 210. In this way, money transaction is executed between the SDeX memory card 400 and the EC server 100.

Since the SDeX memory card 400 relating to the present embodiment has a function as an IC card, in addition to the function of storing delivered audio and video data, it provides more convenience for the user.

Here, the SDeX memory card 400 gains access to the EC server 100 through the card reader/writer 200 in the EC mode according to FIG. 1. Alternatively, the SDeX memory card 400 may gain access to the EC server 100 in such a manner that the SD portable device 300 accesses the EC server 100 through the radio station 210 and the network.

The following part describes how to manufacture the semiconductor memory card according to the present invention. The semiconductor memory card according to the present invention has the internal structure shown in FIG. 2 and FIG. 3 and can be industrially manufactured.

Figure 2:
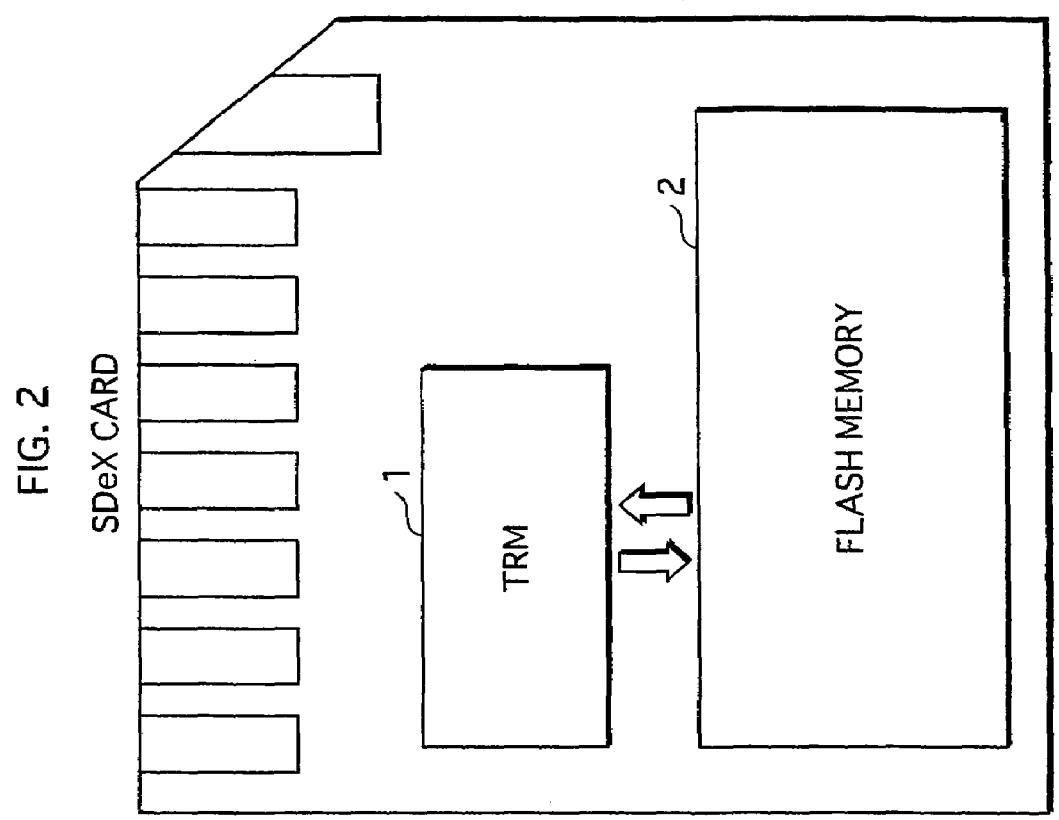
FIG. 2 shows an internal structure of a semiconductor memory card according to the present invention.

As shown in FIG. 2, a connector, a tamper-resistant module chip (TRM) 1 and a flash memory chip 2 having a capacity of as much as 256 megabytes are packaged on the semiconductor memory card according to the present invention.

There are various definitions as to tamper resistance. However, general definitions of tamper resistance appear to be as follows.

(1) Even if a TRM chip is physically opened, its internal structure can not be known.

(2) Even if an electromagnetic wave is irradiated to a TRM chip, its internal structure can not be known.

(3) There is a nonlinear relation between length of data input to a TRM chip and a processing time for the data.

(4) Output data is not obtained through reverse operations based on an error of input data.

Because of these four characteristics, the TRM 1 is resistant to various kinds of reverse operations. The following part describes hardware elements in the TRM 1.

Figure 3:
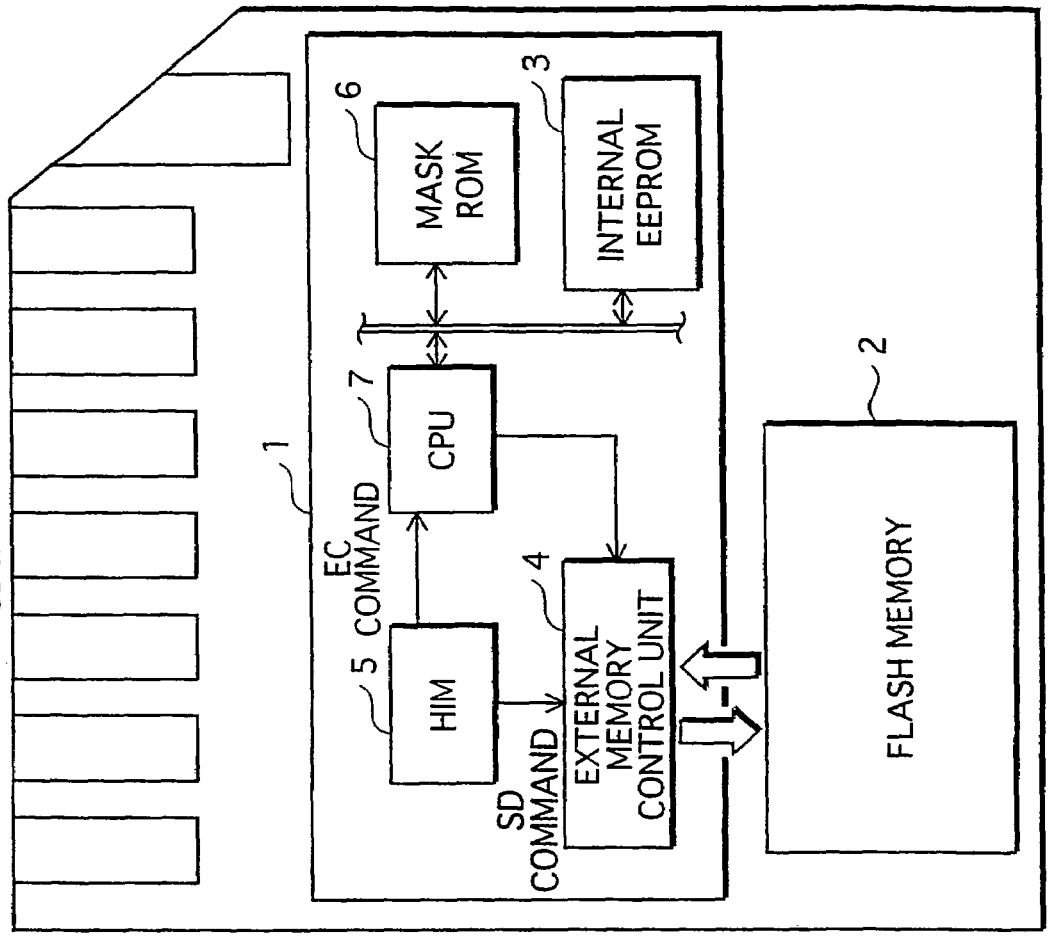
FIG. 3 shows a hardware structure of a TRM 1 (shown in FIG. 2).

FIG. 3 shows the hardware structure in the TRM 1. As shown in FIG. 3, an internal EEPROM 3, an external memory control unit 4, a host interface module (HIM) 5, a mask ROM 6, and a Cpu 7 are packaged on the TRM 1, to constitute a microcomputer system.

The internal EEPROM 3 is a readable and writable internal memory. The microcomputer system, which is packaged as the TRM 1, exhibits a high manufacturing cost per unit area. The internal EEPROM 3 in the TRM 1 has a capacity of 32 kilobytes. The flash memory 2 shown in FIG. 2 is hereinafter sometimes referred to as an external memory to be distinguished from the internal EEPROM 3.

The external memory control unit 4 is a circuit exclusively utilized for the access to the external flash memory 2. The access to the external flash memory 2 is conducted based on an SD command issued by the SD portable device 300.

The HIM 5 classifies SD commands issued by the SD portable device 300 with reference to their command numbers. The SD command numbers are numbers from 1 to m, or extended numbers of (m+1) or more. When the SD command number of an SD command falls within 1 and m, the HIM 5 outputs the SD command to the external memory control unit 4. When the SD command number of an SD command is (m+1) or more, the HIM 5 obtains an EC command that has been capsulated into an extended SD command, and outputs the EC command to the CPU 7.

The mask ROM 6 prestores Java virtual machine and an application program. When the SDeX memory card 400 bootstraps the SD portable device 300, the bootstrap starts from a predetermined address in the mask ROM 6. Thus, the SD portable device 300 is activated to be in the EC mode.

The CPU 7 executes a program stored in the mask ROM 6.

Figure 4:
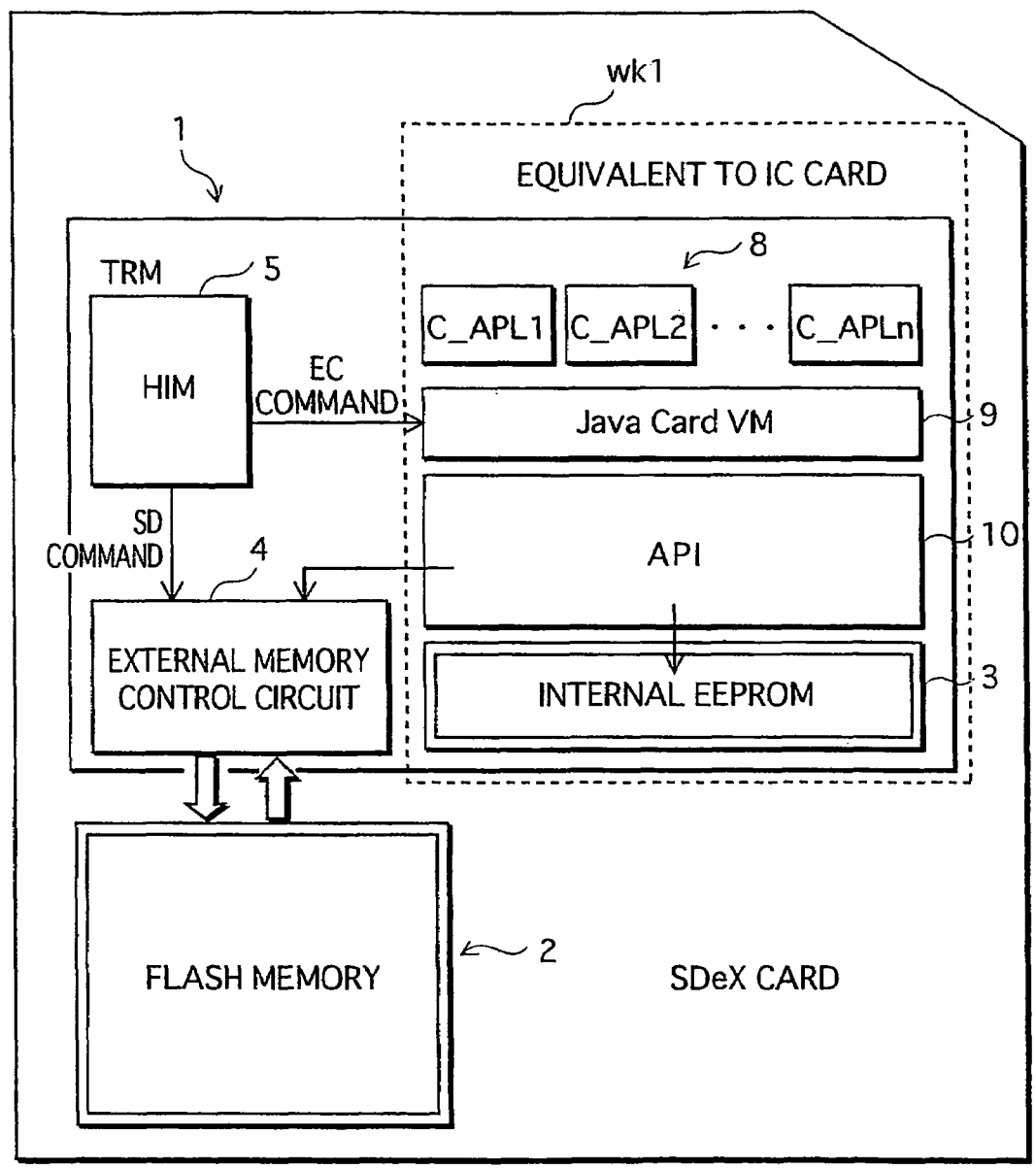
FIG. 4 shows a software structure of a portion constituted by a mask ROM 6 and a CPU 7 (both shown in FIG. 3) in the TRM 1.

FIG. 4 shows a software structure of a portion which is constituted by the mask ROM 6 and CPU 7 in the TRM 1 (shown in FIG. 3). A portion circumscribed by a dotted line wk1 is a module equivalent to an IC card. The rest of the TRM 1 is a module equivalent to an SD memory card.

The portion of the TRM 1 which is equivalent to an SD memory card includes the external memory control unit 4 and the HIM 5. The HIM 5 has not only the function as an SD memory card but also the function as a first contact between the SD-memory-card-equivalent module and the IC-card-equivalent module.

The IC-card-compatible module has a layer structure. In the layer structure, the internal EEPROM 3 is in the bottom layer (physical layer). An application interface (API) 10 is in a layer directly above the layer in which the internal EEPROM 3 is. The Java virtual machine 9 is in a layer directly above the layer in which the API 10 is. An EC client application 8 is in the top layer. It should be noted that the external memory control unit 4 in the SD-memory-card-compatible portion is located in a physical layer similarly to the internal EEPROM 3.

The following part describes the software structure shown in FIG. 4 (the EC client application 8, the Java virtual machine 9 and the API 10).

The EC client application 8 is one kind of EC application written in Java, and gains access to the EC server 100 based on a user's instruction. Since multiple kinds of EC server applications, which respectively correspond to different EC services, operate on the EC server 100, multiple kinds of EC client applications, which respectively correspond to different EC services, operate on the SDeX memory card 400. In FIG. 4, it is indicated that EC client applications C_APL 1, 2, 3 . . . n respectively correspond to EC server applications on the EC server 100 (S_APL 1, 2, 3 . . . n). The EC client application 8 sends/receives commands to/from the EC server applications on the EC server 100 through the card reader/writer 200, the radio base station 210 and the network to obtain various kinds of EC services. When an EC command received from an EC server application is a data writing command, the EC client application 8 outputs the EC command to the API 10 through the Java virtual machine 9.

In addition, the EC client application 8 gains access to the external flash memory 2 and the internal EEPROM 3 based on a user's instruction in the EC mode. The access includes file access such as creating a file and performing read and write operations to the file.

The Java virtual machine 9 (JavaCard VM (registered trademark) in FIG. 4) converts Java language, in which the EC client application 8 is written, into native codes of the CPU 7, and has the CPU 7 execute the EC client application 8.

The API 10 reads/writes from/to the external flash memory 2 and the internal EEPROM 3 based on a command issued by the EC client application 8. In the above part, the software structure of the SDeX memory card 400 has been described.

Figure 5:
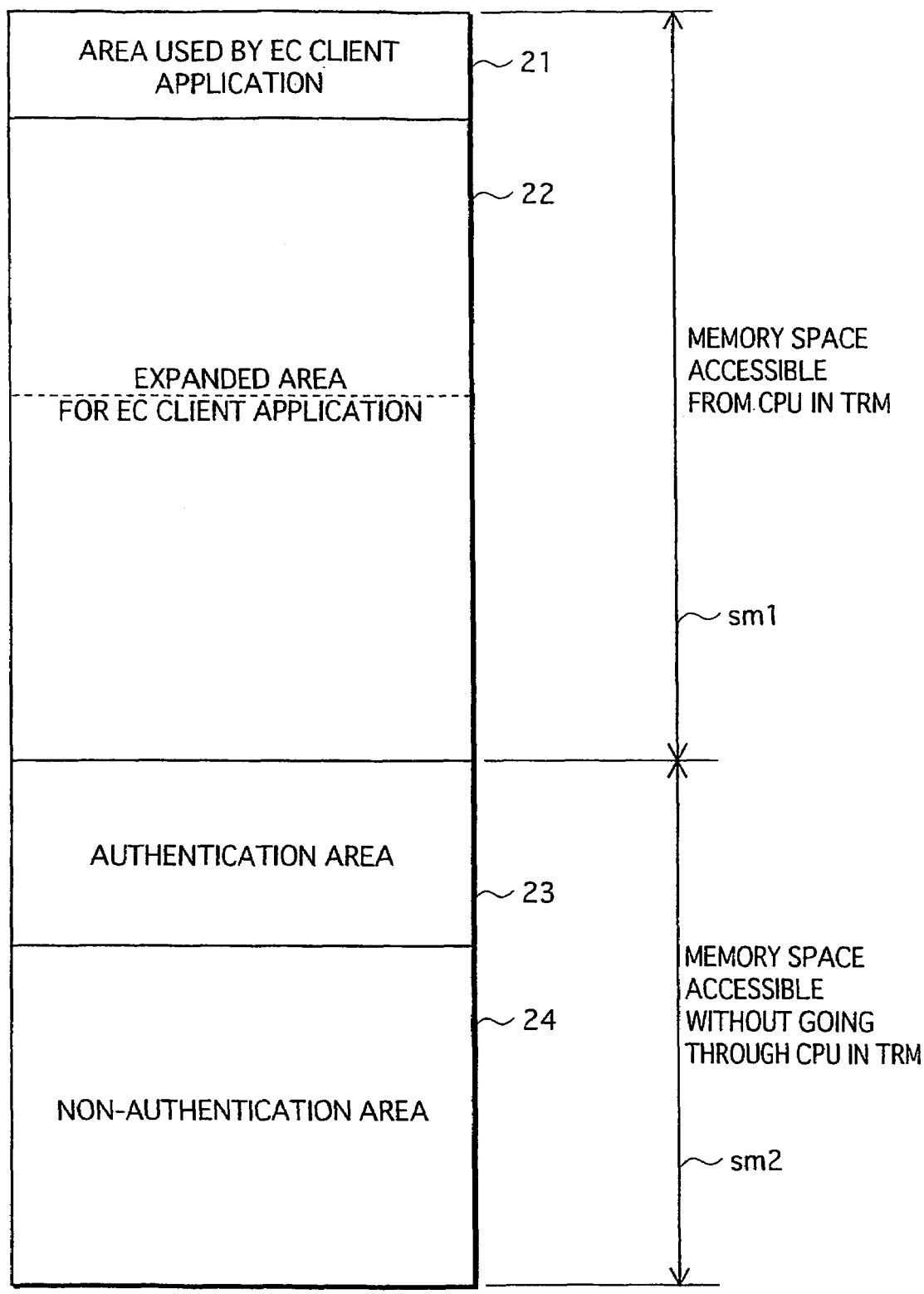
FIG. 5 shows a logical format of an external flash memory 2 and an internal EEPROM 3 (both shown in FIG. 3).

The logical format of the external flash memory 2 and the internal EEPROM 3 is described in the following part. FIG. 5 shows the logical format of the external flash memory 2 and the internal EEPROM 3. The external flash memory 2 and the internal EEPROM 3 have two memory spaces, i.e. sm 1 and sm 2. The memory space sm 1 is accessible from the CPU 7 in the TRM 1, and made up by an area for EC client application 21 and an extended area for the EC client application 22. The memory space sm 2 is accessible from the SD portable device 300 without going through the CPU 7 in the TRM 1. The memory space sm 2 is constituted by an authentication area 23 and a non-authentication area 24. The authentication area 23 and a non-authentication area 24 are memory areas of an SD memory card, and are explained in Japanese patent No. 3389186.

Figure 6:
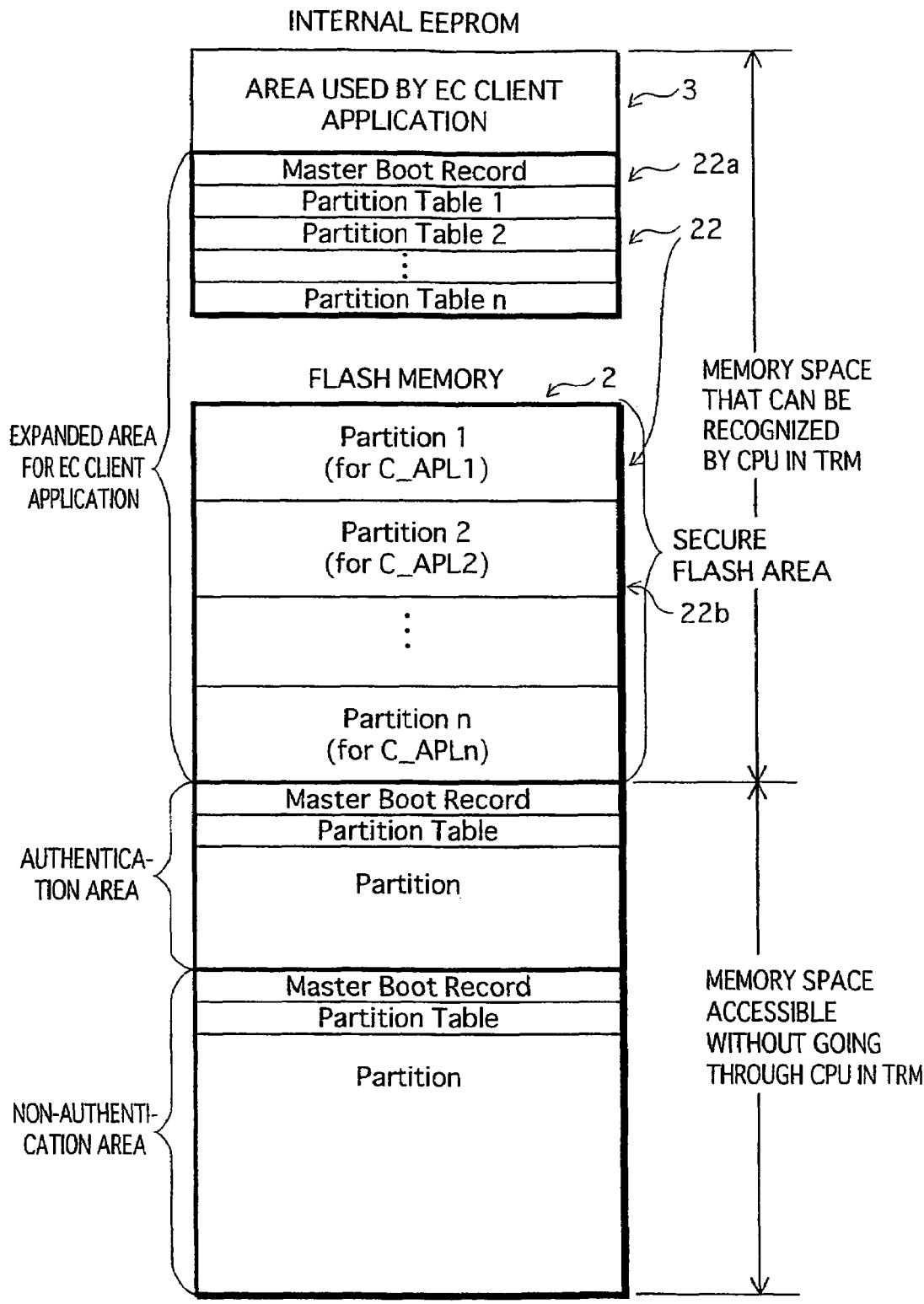
FIG. 6 shows an internal structure of an extended area for an EC client application 22, an authentication area 23, and non-authentication area 24 (shown in FIG. 5).

FIG. 6 shows the structure of the extended area for the EC client application 22, the authentication area 23, the non-authentication area 24, which have a file system structure according to ISO/IEC 9293. However, the ISO/IEC 9293 file system structure only serves as an example and is selected just for the sake of convenience. The extended area for the EC client application 22, the authentication area 23 and the non-authentication area 24 may have other file system structure such as Universal Disk Format (UDF). Generally speaking, a file system structure whereby a length of a fragment is changeable and a start address and a data length are shown in entry information can be employed.

The extended area for the EC client application 22 is constituted by an area 22*a* on the internal EEPROM 3 and a secure flash area 22*b* on the external flash memory 2. The secure flash area 22*b* has partitions 1, 2, 3 . . . n, i.e. file system areas. On the other hand, the area 22*a* in the internal EEPROM 3 includes a master boot record and reference tables for partitions (partition tables 1, 2, 3 . . . n).

Figure 7:
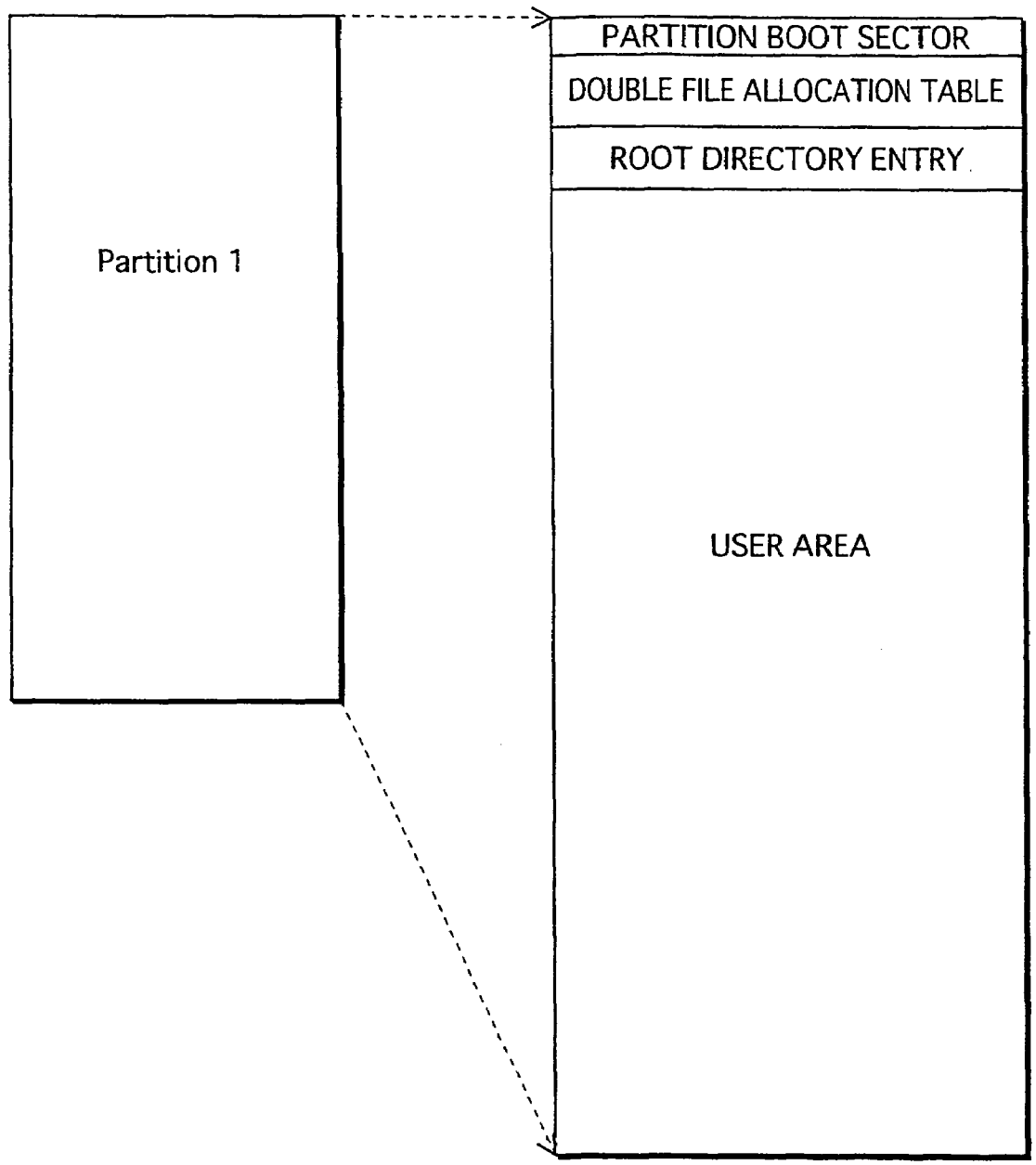
FIG. 7 shows a structure of a partition.

Partitions in the extended area for the EC client application 22, the authentication area 23, and the non-authentication area 24 have the same internal structure. FIG. 7 shows such a structure of a partition.

A partition includes a partition boot sector, a double file allocation table (FAT), a root directory entry, and a user area.

The partition boot sector is a table that shows information regarding the partition.

Figure 8:
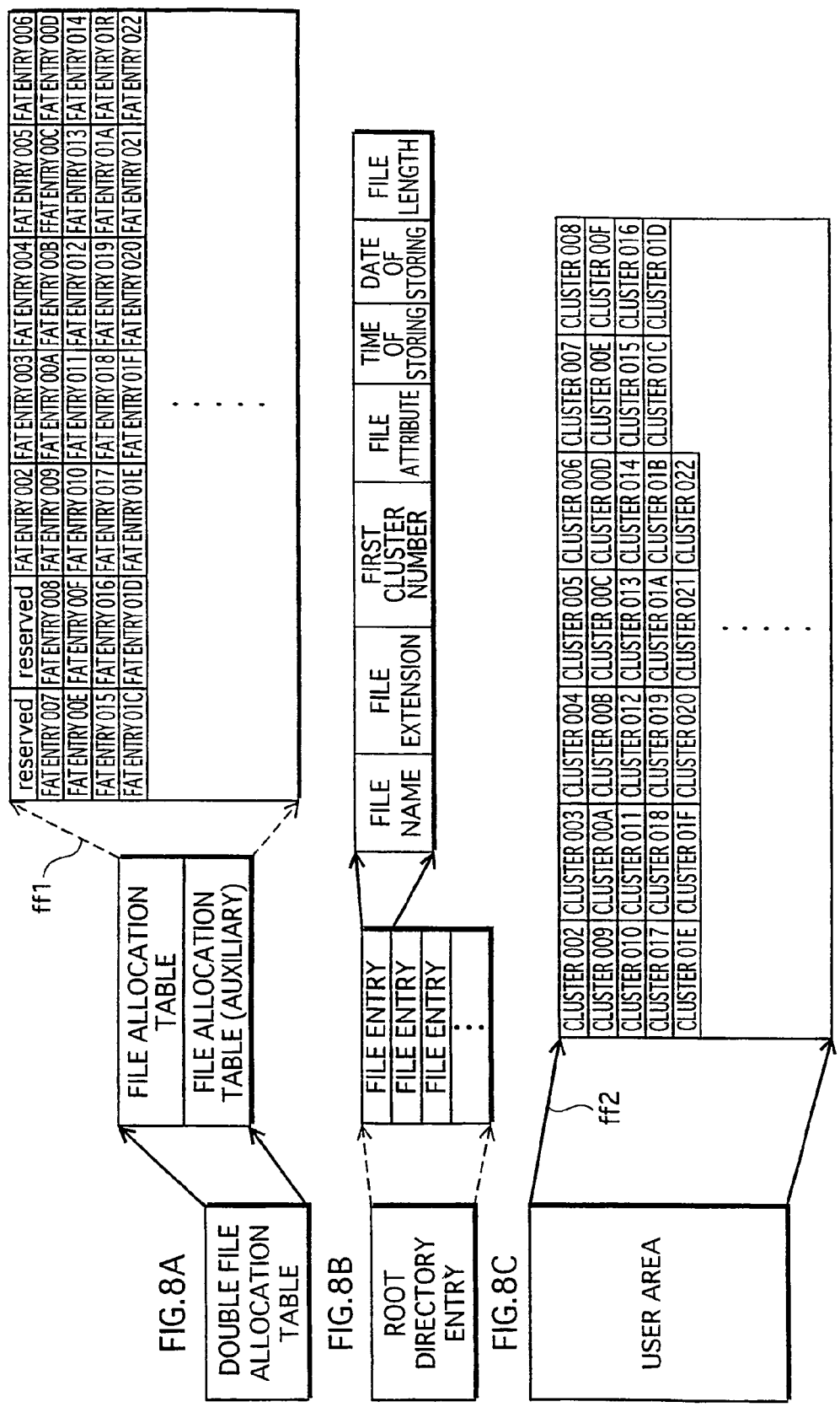
FIG. 8a shows a structure of a double FAT.
FIG. 8b shows a structure of a root directory entry.
FIG. 8c shows a structure of a user area.

The double FAT includes two FATs in accordance with ISO/IEC 9293. Each FAT includes a plurality of FAT entries in one-to-one correspondence with clusters. Each FAT entry indicates whether a corresponding cluster is used or not. If a corresponding cluster is not used, the value of a FAT entry is set at "0". If a corresponding cluster is being used, the value of a FAT entry is set at the value of a cluster number that indicates link relations between clusters, that is to say, a next cluster to be read after the corresponding cluster. A dotted line ff1 in FIG. 8*a* indicates a plurality of FAT entries 002, 003, 004, 005 . . . included in a FAT. The number given to each FAT entry (002, 003, 004, 005 . . . ) indicates a corresponding cluster, that is to say, a cluster number of a cluster corresponding to a FAT entry.

The root directory entry includes a plurality of file entries in a root directory each of which corresponds to a file. Each file entry includes entries of "FILE NAME" indicating a name of a file, "FILE EXTENSION" showing a file extension of the file, "FIRST CLUSTER NUMBER" indicating a cluster storing a start of the file, "FILE ATTRIBUTE" indicating an attribute of the file, "TIME OF STORING" indicating a time at which the file is stored, "DATE OF STORING" indicating the date on which the file is stored, "FILE LENGTH" indicating a data length of the file.

In the user area, a file is stored and the smallest unit is a cluster. A dotted line ff2 in FIG. 8*c* indicates a plurality of clusters 002, 003, 004, 005 . . . in the user area. The numbers in FIG. 8*c* (002, 003, 004, 005, 006, 007, 008 . . . ) are three-digit cluster numbers in hexadecimal that have a purpose of identifying each cluster. Since access to the data area is conducted in units of a cluster, at the smallest, a location in the data area is indicated by the cluster numbers.

Figure 9:
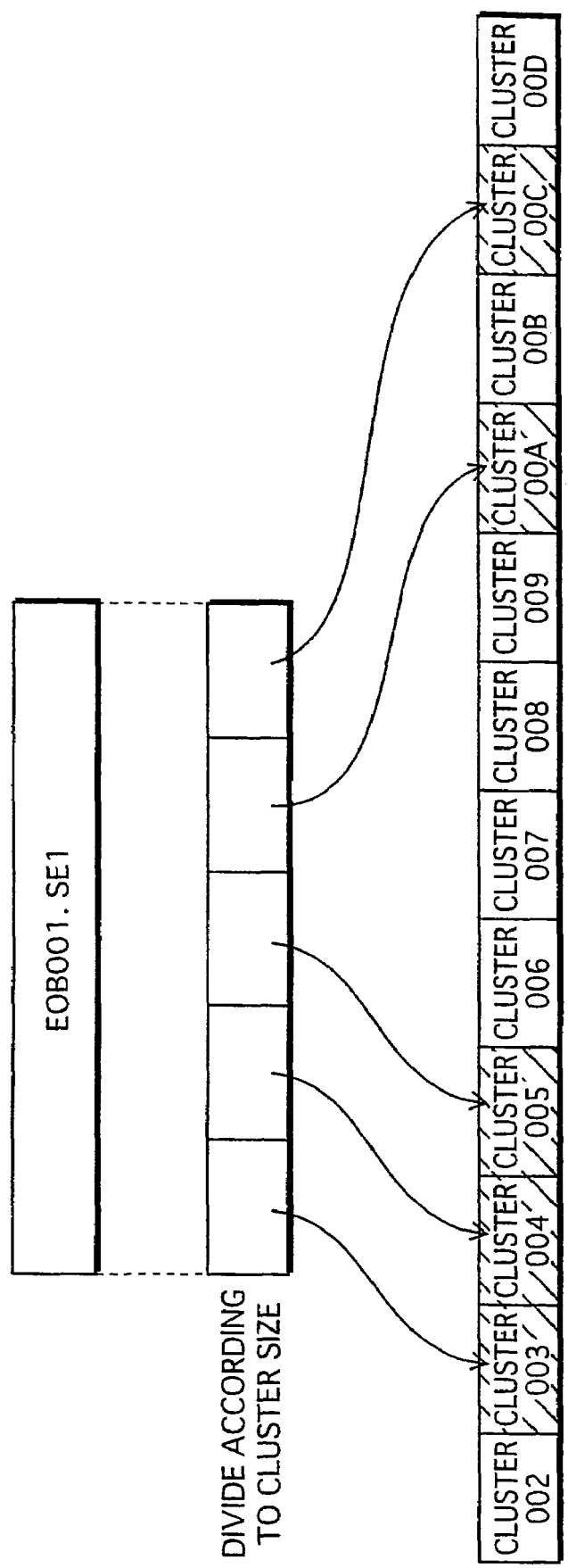
FIG. 9 shows that a file named EOB001.SE1 is divided into five fragments in accordance with the size of a cluster and that the fragments are stored in clusters 003, 004, 005, 00A and 00C respectively.

Here, how a file named EOB001.SE1 is stored in a root directory, that is to say, one example method of storing a file is described in the following part with reference to FIG. 9. Here, "EOB" of "EOB001.SE1" is a short form for an EC Object, and "SE" is an extension named after "Secure EC". As mentioned above, since the smallest accessible unit in the data area is a cluster, the file EOB001.SE1 needs to be stored in the data area in the smallest units of a cluster. The file EOB001.SE1 is first divided into fragments each having a size of a cluster, and each is written into a cluster. FIG. 9 shows that the file EOB001.SE1 is divided into five fragments according to a cluster size and that the fragments are stored into clusters 003, 004, 005, 00A and 00C respectively.

Figure 10:
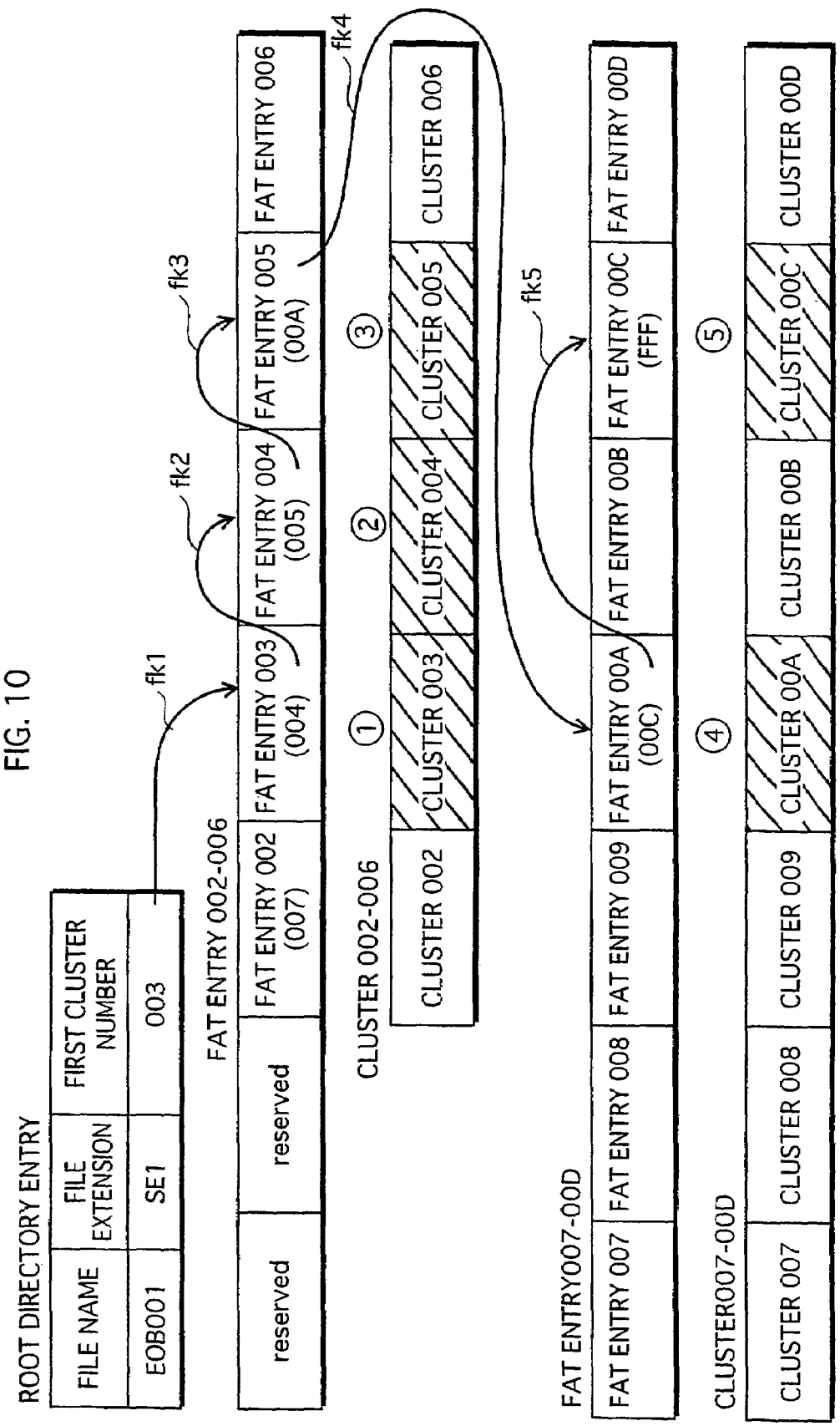
FIG. 10 shows examples of a root directory entry and a FAT for a file "EOB001.SE1", which is divided to be stored in a plurality of clusters.

If the file EOB001.SE1 is fragmented as described above, a directory entry and a FAT need to be set as shown in FIG. 10.

FIG. 10 shows, as an example, a directory entry and a FAT when the file EOB001.SE1 is separately stored in a plurality of clusters. According to FIG. 10, since a start of the file EOB001.SE1 is stored in a cluster 003, the "FIRST CLUS- TER NUMBER" entry in a root directory entry shows 003, i.e. the cluster number of the cluster storing the start. It can be seen from FIG. 10 that two subsequent fragments of the file EOB001.SE1 are stored in clusters 004 and 005 respectively. The cluster 003 storing the start of the file EOB001.SE1 corresponds to a FAT entry 003 (004). Here, the FAT entry 003 shows 004 indicating the cluster 004 storing the subsequent to the start. In addition, the clusters 004 and 005 storing two fragments subsequent to the start correspond to the FAT entries 004 (005) and 005 (00A). These FAT entries shows 005 and 00A indicating the clusters 005 and 00A storing subsequent fragments.

If cluster numbers in FAT entries are traced according to arrows fk1, tk2, fk3, fk4 and fk5, all of the fragments constituting the file EOB001.SE1 can be read. It can be seen from the above description that the smallest accessible unit to the user area of the SDeX memory card 400 is a cluster and that clusters correspond to FAT entries in one-to-one correspondence. A FAT entry that corresponds to a cluster storing an end of an EOB file (cluster 00C in FIG. 9) shows "FFF", which indicates a corresponding cluster stores the last fragment of the file.

Figure 11:
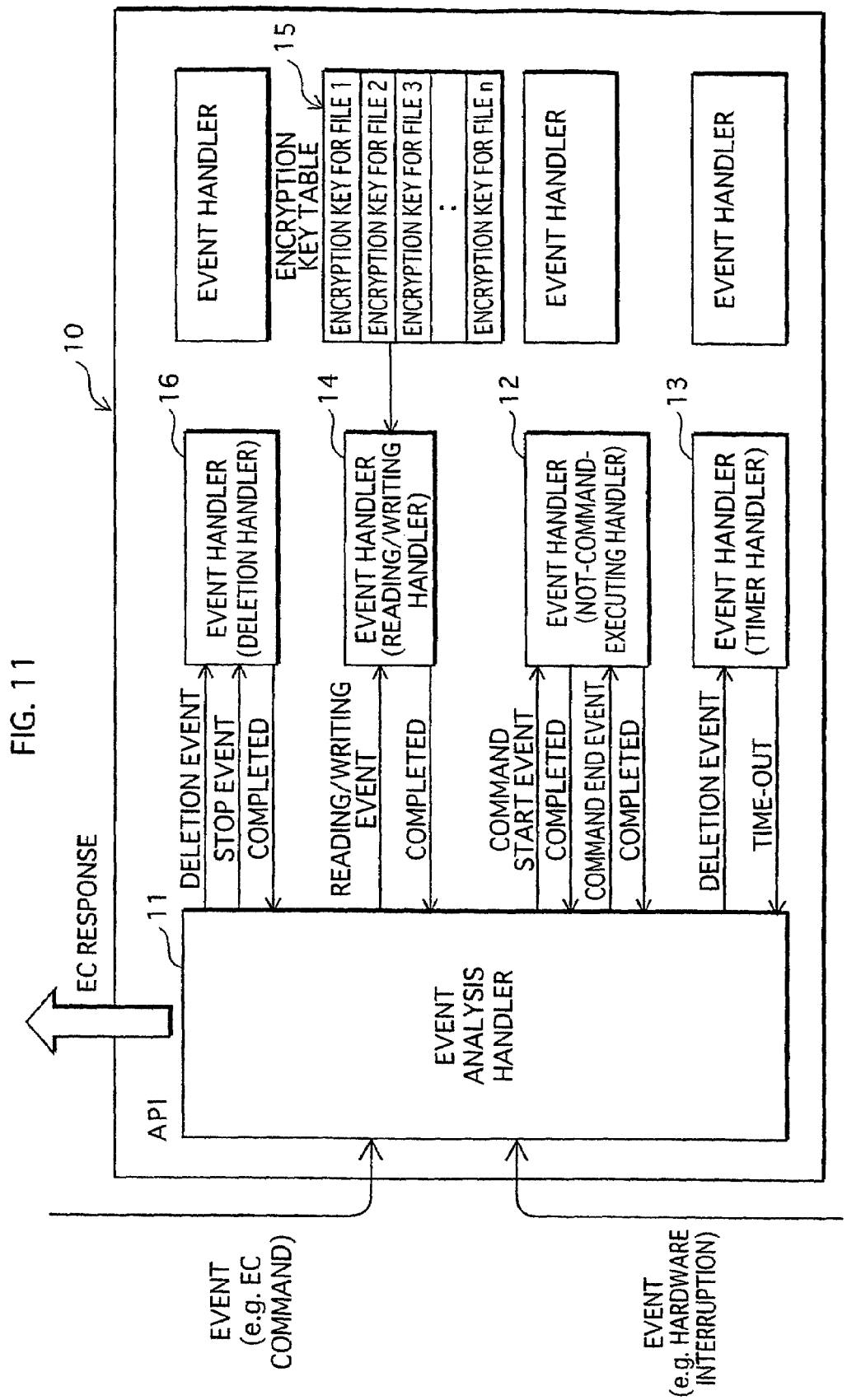
FIG. 11 shows a structure of an API 10 (shown in FIG. 4).

The following part describes the structure of the API 10. Here, an event is a generic term that represents an input to the API 10, for example, an EC command, the occurrence of hardware interruption and input of communication data. The API 10 is constituted by programs that start in response to an event that occurs inside and outside of the API 10. Such a program is called "an event handler" and illustrated in FIG. 11 that shows the structure of the API 10. As shown in FIG. 11, the API 10 includes event handlers such as, an event analysis handler 11, a not-command-executing handler 12, a timer handler 13, a reading/writing handler 14, an encryption key table 15, and a deletion handler 16.

The event analysis handler 11 analyzes events that occur inside and outside of the API 10, and generates an API-internal event in accordance with the result of the analysis. One of the most common events that occur outside the API 10 is an EC command issued by the EC client application 8. The event analysis handler 11 analyzes the contents of EC commands If an EC command indicates read and write operations to a file, the event analysis handler 11 generates internal events of a file reading/writing event and a command start event. If an EC command indicates file deletion, the event analysis handler 11 generates internal events of a file deletion event and a command start event. The generation of these internal events causes an event handler for read and write operations to a file or an event handler for deleting a file to operate respectively.

The API-internal events include an event which indicates a procedure by an event handler has been completed (a completion event). When an event handler executing an EC command generates a completion event, the event analysis handler 11 outputs an EC response to the EC client application 8 which has issued the EC command.

The not-command-executing handler 12 operates when none of the other event handlers in the API 10 is executing a command. The driving period for the not-command-executing handler 12 and the driving periods for other event handlers that execute EC commands are mutually exclusive. Which is to say, the not-command-executing handler 12 operates if no other event handlers operates.

The timer handler 13 starts measuring a time when a command start event is generated, and tells a time-out when the measured time becomes equal to a predetermined time period. The event analysis handler 11 monitors if the timer handler 13 tells a time-out, so as to be able to compel a lengthy operation by an event handler to stop. Such a compulsory stop is achieved by a stop event by the event analysis handler 11.

Figure 12A:
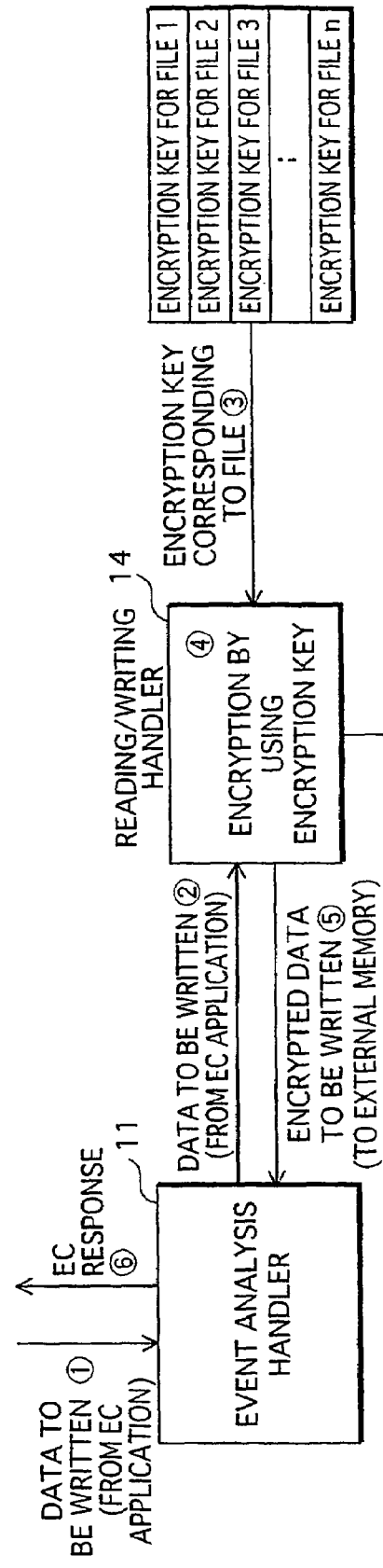
FIG. 12a shows how a write operation to a file is performed by the reading/writing handler 14.

The reading/writing handler 14 reads/writes to/from a file on the external flash memory 2 and the internal EEPROM 3 when a reading/writing event is generated. FIG. 12a shows how a write operation to a file is performed by the reading/writing handler 14.

Figure 12B:
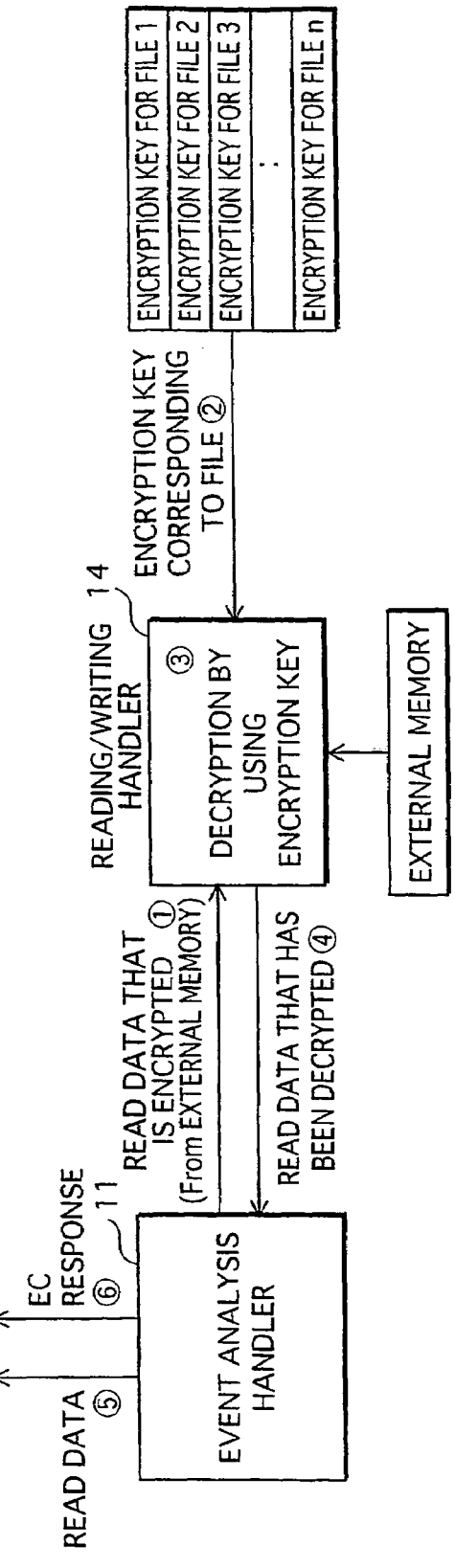
FIG. 12b shows how a read operation to a file is performed by the reading/writing event handler 14.

A write operation to a file is performed in the following manner. The reading/writing handler 14 receives the name of a file to which data is to be written and the data to be written from the EC client application 8 (C_APL 1, 2, 3 . . . n) (see FIG. 12a (1) and (2)). In addition, an encryption key which is assigned to the file to which the data is to be written is obtained by the reading/writing handler 14 from the encryption key table 15 (3). After this, the data received from the EC client application 8 (C_APL 1, 2, 3 . . . n) is encrypted with the encryption key obtained from the encryption key table 15 (4), so as to be written into the file (5). FIG. 12b shows how a read operation to a file is performed by the reading/writing event handler 14.

A read operation to a file is performed in the following manner. The reading/writing handler 14 receives the name of a file to be read from the EC client application 8 (C_APL 1, 2, 3 . . . n). After encrypted data is read from the external flash memory 2 (FIG. 12b (1)), an encryption key assigned to the file to be read is obtained from the encryption key table 15 (2). Then, the read data is decrypted with the obtained encryption key (3), so as to be passed to the EC client application 8 (C_APL 1, 2, 3 . . . n) ((4) and (5)).

The encryption key table 15 shows the one-to-one correspondence between encryption keys for files and file names. An encryption key is generated by the reading/writing handler 14 and registered in the encryption key table 15 when the EC client application 8 creates a file. Registered encryption keys in the encryption key table 15 are referred to when a file is opened and read and write operations are performed to a file.

The deletion handler 16 operates when a deletion event is generated. When a deletion event is generated, a file entry, a FAT and a file entity which constitute a file are overwritten by the deletion handler 16 with null codes, after a clew operation file management table is created. A file deletion in the present embodiment indicates both overwriting of an encryption key, a file entry and a FAT for a file, and overwriting of a file entity of the file. Here, overwriting indicates overwriting with null codes (to null-clear) or in a particular manner. The deletion handler 16 prioritizes the former overwriting. Since the latter overwriting requires an enormous processing time, it may be performed by other event handlers. However, according to the present invention, overwriting of a file entity for a file, which requires an immense processing time, is confidentially and separately performed in a plurality idle periods.

Figure 13:
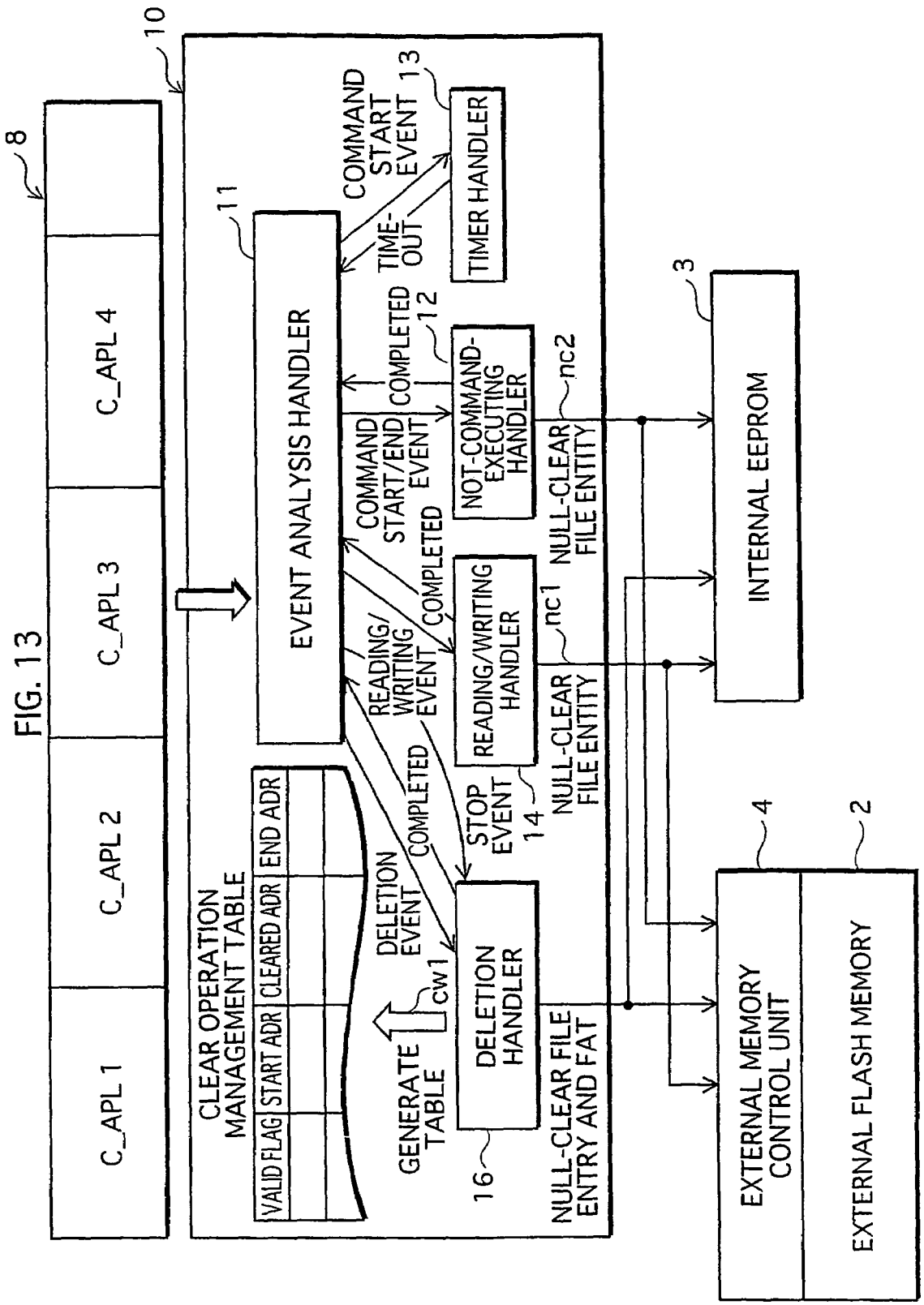
FIG. 13 illustrates an internal structure of the API 10 with a focus on the characteristics of a deletion handler 16 (shown in FIG. 11).

FIG. 13 shows the internal structure of the API 10 with a focus on the above-mentioned characteristic of the present invention. As shown by an arrow cw 1 in FIG. 13, when a deletion event is generated, a clear operation management table is created by the deletion handler 16 and then written in the memory 3 in the TRM 1. A clear operation management table shows how overwriting should be performed. Such a clear operation management table is created prior to overwriting of a file entry and a FAT in order to inform, of other event handlers, the existence of fragments that should be null-cleared and how much data of a file has been null-cleared. If a clear operation management table has been created, the not-command-executing handler 12, the reading/writing handler 14 and the deletion handler 16 overwrite X (unit length) bytes of a fragment (as shown by arrows nc1 and 2) with reference to the clear operation management table. After this, the clear operation management table is updated. As indicated by the arrows nc1 and 2, files stored in both the external flash memory 2 and the internal EEPROM 3 can be null-cleared in the present embodiment. Here, however, only a null-clear operation to a file stored in the external flash memory 2 is described here to avoid a complicated explanation. A null-clear operation can be performed whether a file entity for a file is fragmented or not in the present embodiment. Here, however, only a null-clear operation which is performed when a file entity for a file is fragmented to avoid a cumbersome description. (For this reason, "a file entity" is coherently replaced with "fragments" in the following part.)

Figure 14:
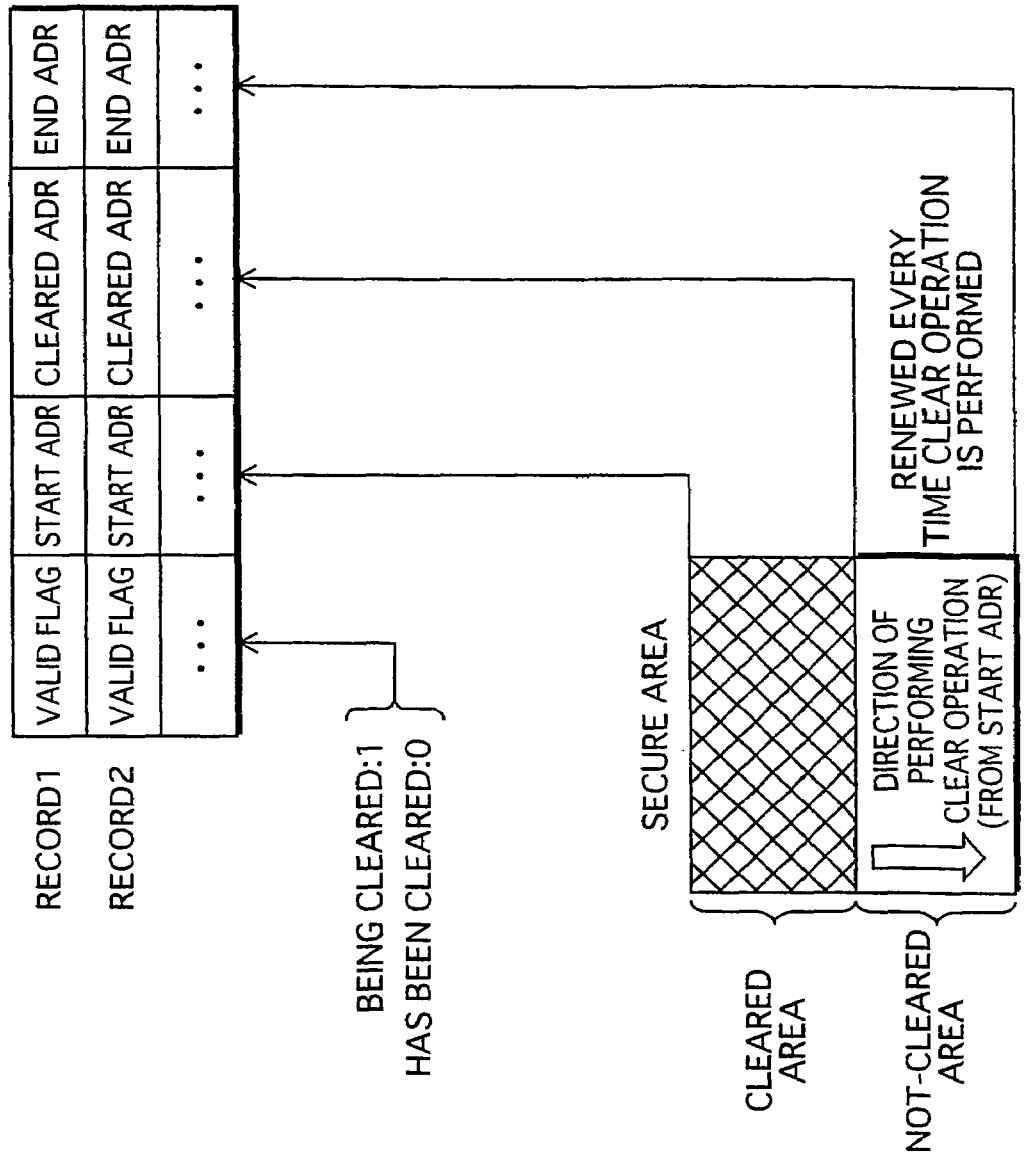
FIG. 14 shows an example of a clear operation management table.

FIG. 14 shows, as an example, a clear operation management table. A clear operation management table is composed of a plurality of records in one-to-one correspondence with fragments. Each record has four entries: "VALID FLAG" that shows whether a corresponding fragment is being cleared or has been completely cleared; "START ADR" indicating a start address of the fragment; "CLEARED ADR" indicating a cleared address that shows how much data of the fragment has been null-cleared, if a clear operation to the fragment is halfway; and "END ADR" indicating an end address of the fragment. The deletion handler 16 sets the values of START ADR and END ADR based on the addresses stated in the above-mentioned FAT or file entry.

Figure 17:
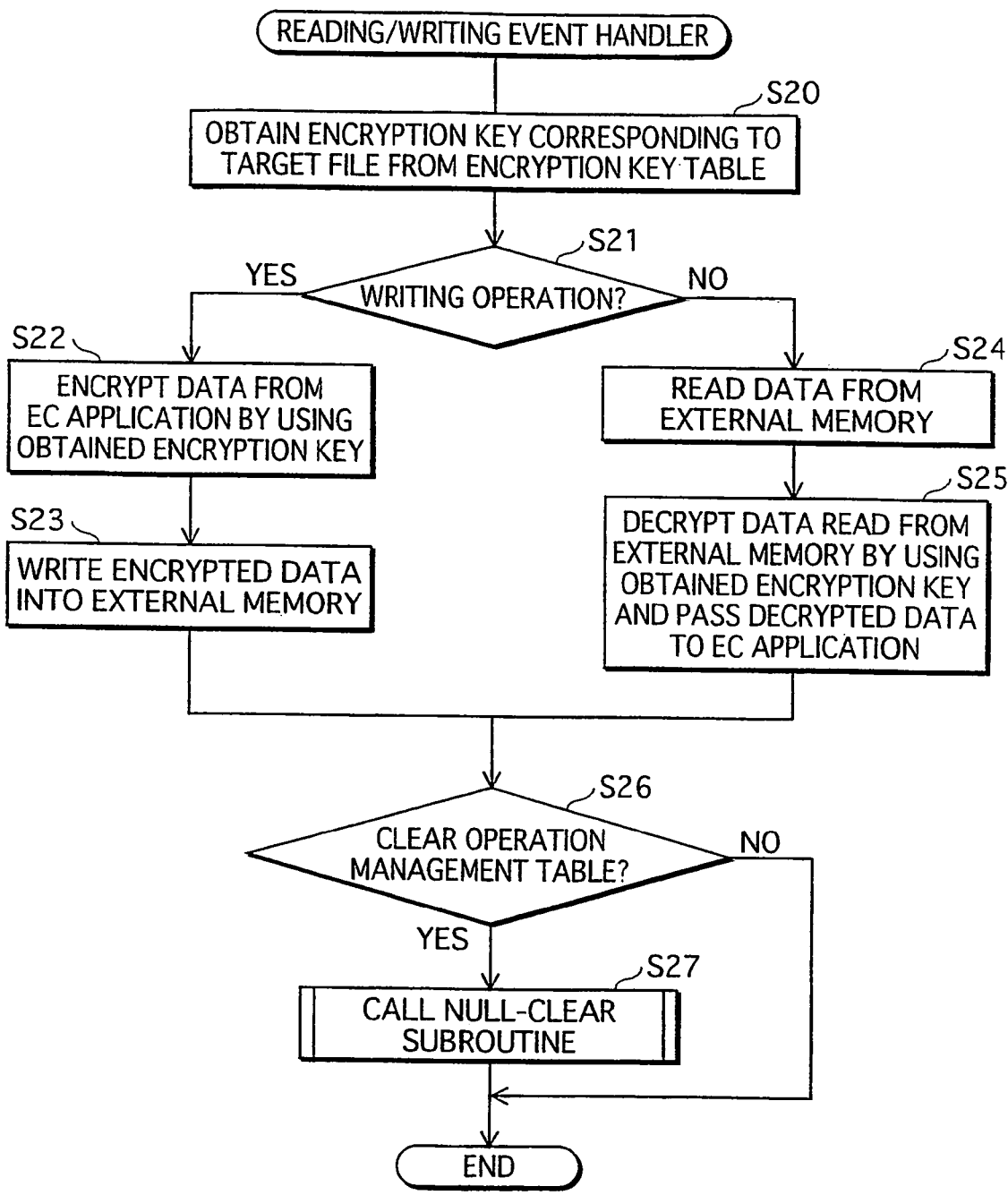
FIG. 17 is a flow chart illustrating a procedure of the reading/writing handler 14.
Figure 18:
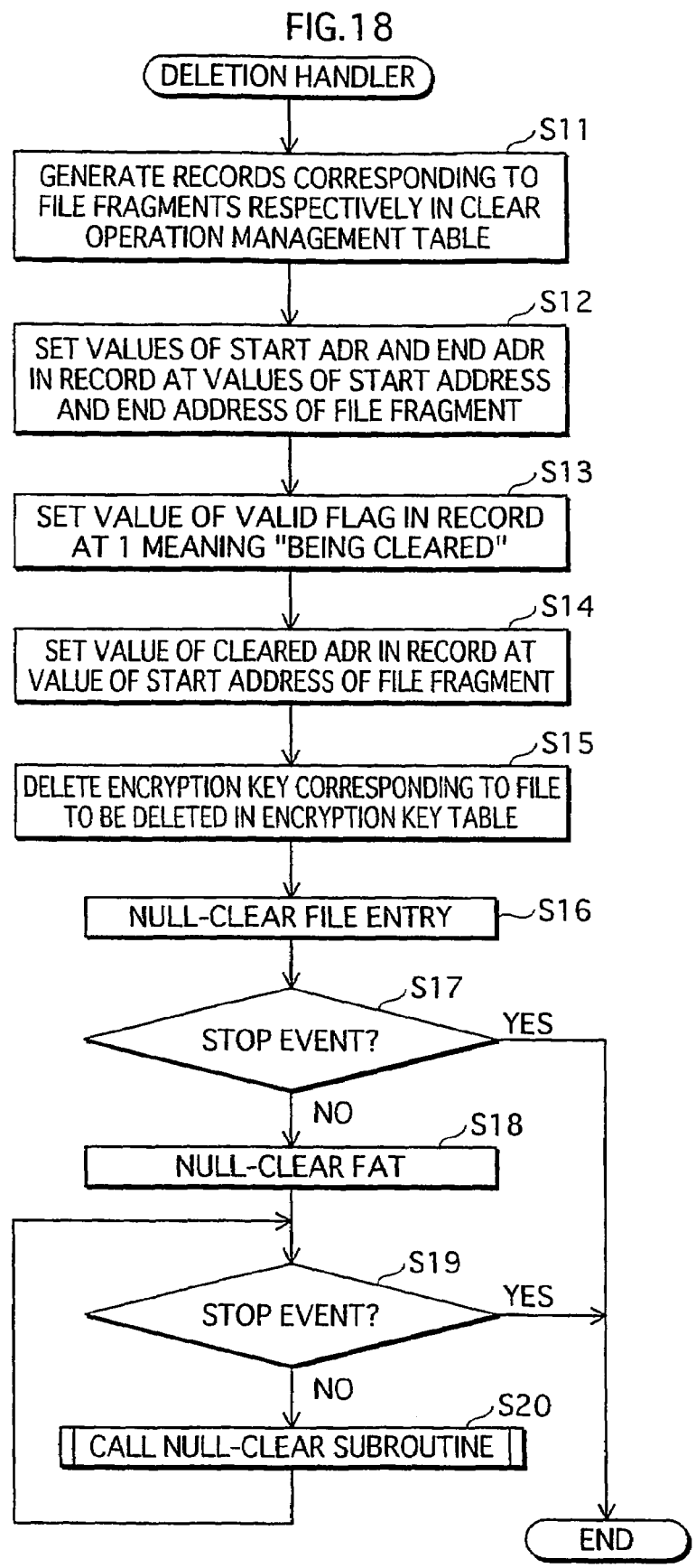
FIG. 18 is a flow chart illustrating a procedure of a deletion handler 16 (shown in FIG. 11).
Figure 19:
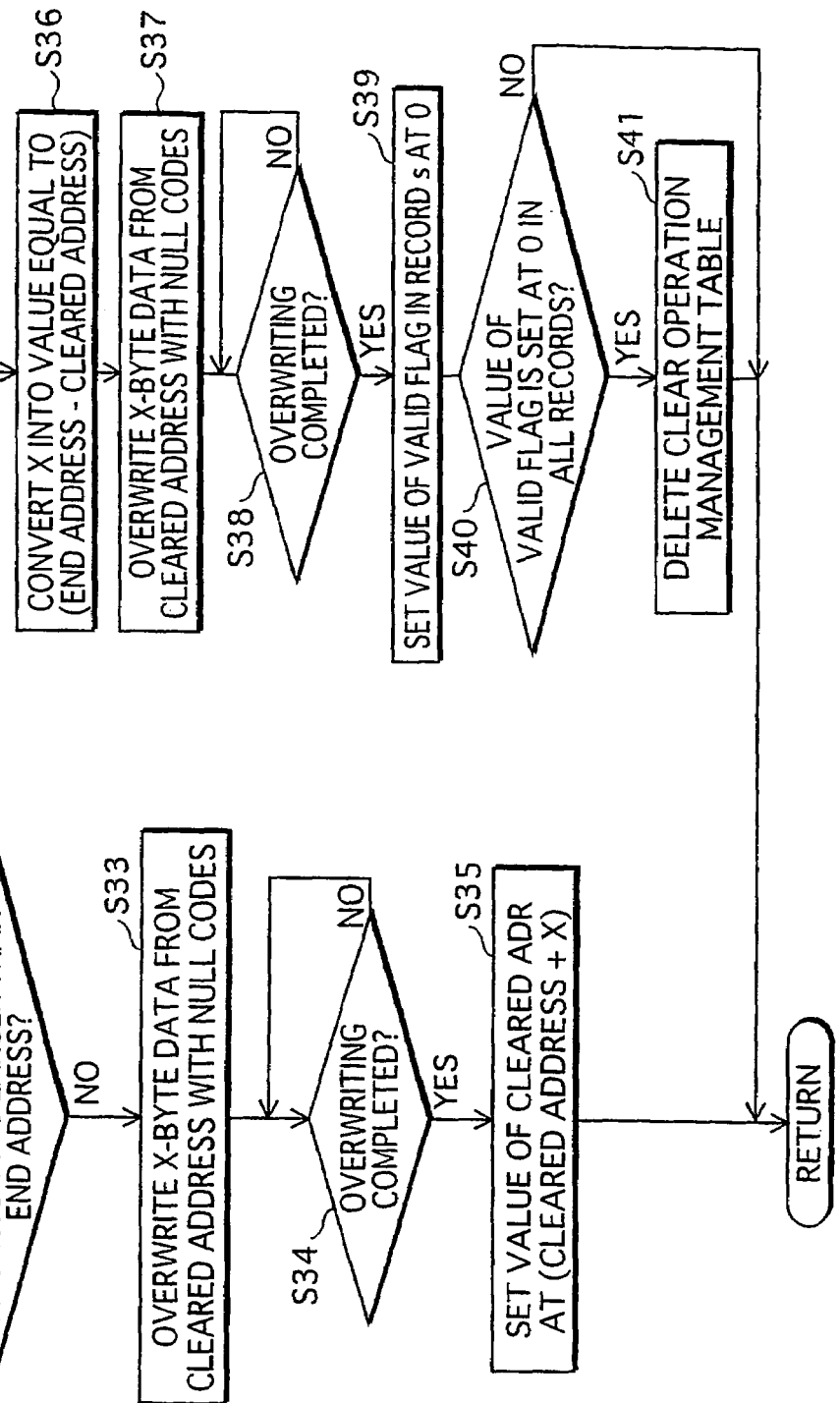
FIG. 19 is a flow chart illustrating a procedure of a null-clear subroutine.

The event analysis handler 11, not-command-executing handler 12, the reading/writing handler 14 and the deletion handler 16 in the API 10 are generated by writing programs that perform procedures shown in FIGS. 15, 16, 17, 18 and 19 in computer languages. FIGS. 15, 16, 17, and 18 are flow charts illustrating procedures of the event analysis handler 11, the not-command-executing handler 12, the reading/writing handler 14 and the deletion handler 16 respectively. FIG. 19 is a flow chart showing a procedure of a null-clear operation. A null-clear operation indicates overwriting X bytes of fragments with null codes. Since a null-clear operation is executed by the not-command-executing handler 12, the reading/writing handler 14 and the deletion handler 16, a null-clear operation is considered to be a subroutine.

Figure 15:
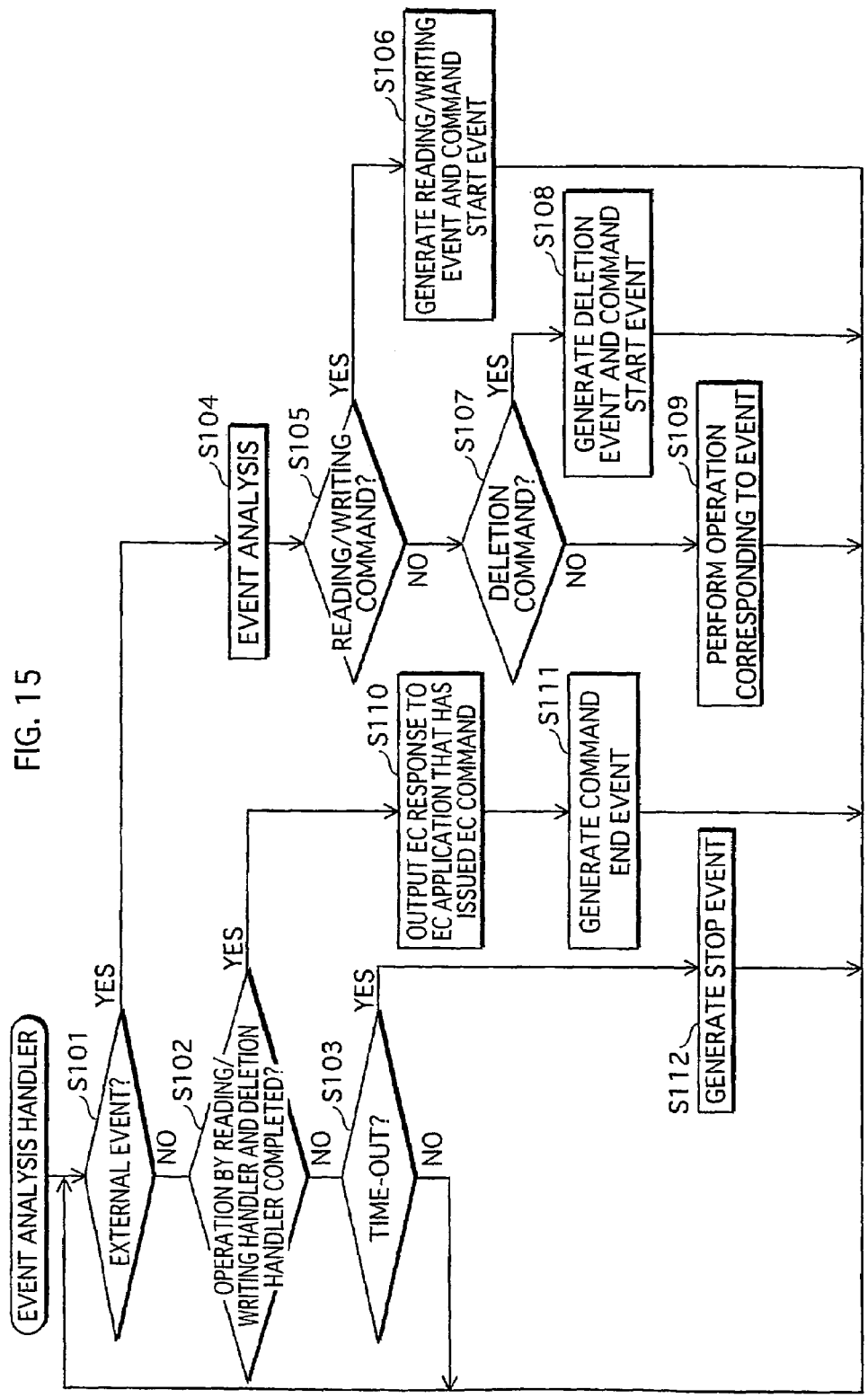
FIG. 15 is a flow chart illustrating a procedure of an event analysis handler 11 (shown in FIG. 11).

FIG. 15 is a flow chart illustrating a procedure of the event analysis handler 11.

The steps S101 to S103 in FIG. 15 form a loop procedure for scanning an event. This loop procedure checks whether an external event occurs (the step S101), whether operations by the reading/writing handler 14 and the deletion handler 16 have been completed (the step S102), and whether the procedure of the timer handler 13 has been completed (the step S103).

A procedure of the steps from S104 to S109 is to be performed if the occurrence of an external event is detected in the step S101.

In the step S104, an event analysis is conducted to judge whether an external event is an EC command or not and, if the judgment is affirmative, the contents of the EC command are analyzed. If an external event is an EC command that instructs read and write operations to a file on the external flash memory 2, that is to say, a reading/writing command, a reading/writing event and a command start event are generated (the step S106). Then, the procedure of the event analysis handler 11 goes back to the loop procedure of the steps S101 to S103.

If an external event is an EC command that instructs deletion of a file on the external flash memory 2, that is to say, a deletion command, a deletion event and a command start event are generated (the step S108). Then, the procedure of the event analysis handler 11 goes back to the loop procedure of the steps S101 to S103.

If an external event other than the above examples occurs, an operation corresponding to the event is performed (the step S109). Then, the procedure of the event analysis handler 11 goes back to the loop procedure of the steps S101 to S103.

The steps S110 and S111 are performed when the procedures by the reading/writing handler 14 and the deletion handler 16 have been completed. In these steps, an EC response is output to the EC client application 8 that has issued a command, and a command end event is generated in the API 10.

The step S112 is performed when the timer handler 13 tells a time-out. In this step, a stop event is generated.

Figure 16:
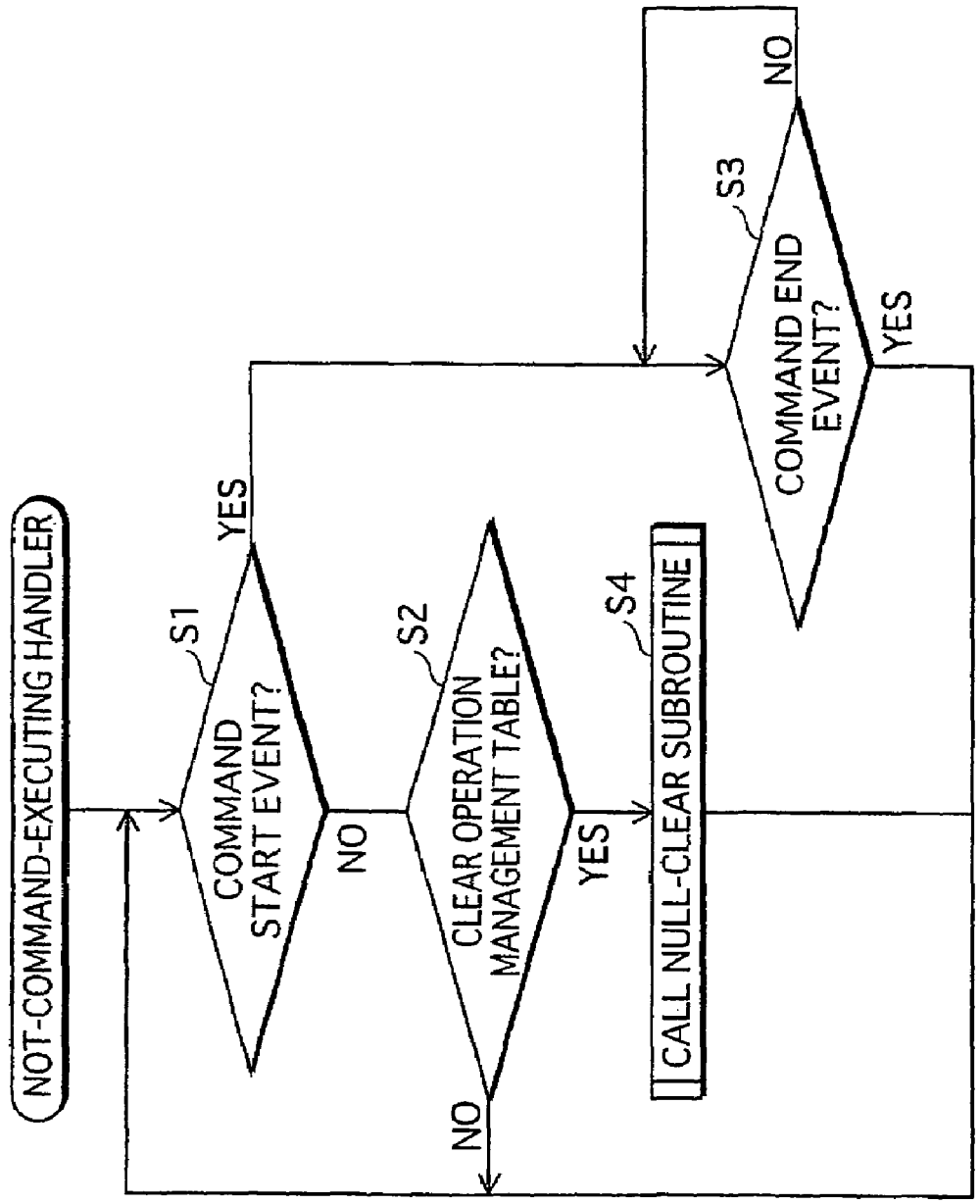
FIG. 16 is a flow chart illustrating a procedure of a not-command-executing handler 12 (shown in FIG. 11).

FIG. 16 is a flow chart illustrating a procedure of the not-command-executing handler 12. The steps S1 and S2 form a loop procedure, in which it is checked whether a command start event is generated (the step S1) and whether a clear operation management table exists (the step S2). It is judged whether a clear operation management table exists or not in the step S2 in every cycle of the steps S1 and S2. If a clear operation management table exists, a null-clear subroutine is called (the step S4). Here, overwriting of fragments by the not-command-executing handler 12 is performed in an idle period during which no other event handlers operate. Therefore, even though it takes long to overwrite a file due to the property of a semiconductor memory card, a user is not bothered by the lengthiness.

FIG. 17 is a flow chart illustrating a procedure of the reading/writing handler 14. An encryption key corresponding to a file to which read and write operations are to be performed is obtained from the encryption key table 15 in the step S20. It is judged whether to perform a write operation or not in the step S21. If a write operation is performed, data from the EC client application 8 is encrypted with the encryption key obtained in the step S20 (the step S22) and the encrypted data is written in the secure flash memory 2 (the step S23).

On the other hand, if the judgment in the step S21 indicates a read operation is to be performed, encrypted data that is required by the EC client application 8 is read from the secure flash memory 2 (the step S24). The encrypted data read from the secure flash memory 2 is then decrypted using the encryption key obtained in the step S20, and passed to the EC client application 8 (the step S25).

It is judged whether a clear operation management table exists or not in the step S26. If no clear operation management table exists, the procedure is completed. However, if a clear operation management table exists, a null-clear operation is performed in the step S27.

FIG. 18 is a flow chart illustrating a procedure of the deletion handler 16. Firstly, records are generated in one-to-one correspondence with file fragments in the step S11. The values of START ADR and END ADR in each record are set at the values of start and end addresses of a corresponding file fragment in the step S12. The value of VALID FLAG in each record is set at "1" indicating that a corresponding fragment is being cleared in the step S13. The value of CLEARED ADR in each record is set at the value of the start address of a corresponding file fragment in the step S14.

Among a plurality of encryption keys in the encryption key table 15, an encryption key corresponding to a file to be deleted is deleted in the step S15. This deletion of the encryption key makes it impossible to decrypt the file.

After a file entry is null-cleared in the step S16, it is judged whether a stop event is generated or not in the step S17. The procedure of the deletion handler 16 is terminated when a stop event is generated.

If a stop event is not generated, a FAT is null-cleared in the step S18. Since a file entry and a FAT have been null-cleared at this stage, fragments constituting a file entity of a file have lost link relations therebetween and have become disconnected from each other.

After this, it is judged whether a stop event is generated or not in the step S19. If a stop event is generated, the procedure of the deletion handler 16 is terminated. If a stop event is not generated, fragments of a file are null-cleared in the step S20.

Following this, the procedure of the steps S19 to S20 is repeated. In this way, overwriting of fragments by the deletion handler 16 is continued until the timer handler 13 tells a time-out.

FIG. 19 is a flow chart illustrating a procedure of a null-clear subroutine. The first record among records which have a value of VALID FLAG being set at "1" is selected as a record s in the step S31. It is judged whether a data length from a cleared address to an end address is longer or shorter than a unit length X to determine a step to be performed after the step S31. This judgment is made in the step S32. Which is to say, it is judged whether an address obtained by adding the unit length X of overwriting to the cleared address is smaller than the end address of the record s. If the judgment is affirmative, the steps S33 to S35 are subsequently performed. In these steps, the external memory control unit 4 is instructed to overwrite X-byte data starting from the cleared address in a corresponding fragment (the step S33). When the overwriting by the external memory control unit 4 is completed (the step S34), the cleared address is renewed to (the cleared address plus+X) (the step S35).

If a data length from the cleared address to the end address is longer than the unit length X, the steps S36 to S39 are performed to deal with a surplus data length. According to these steps, the unit length X is converted so as to be equal to a value obtained by subtracting the cleared address from the end address (the step S36). After this, it is instructed to the external memory control unit 4 that an X-byte data starting from the cleared address is overwritten with null codes (the step S37). When the overwriting is completed, the value of VALID FLAG of the record s is set at "0" (the step S39). It is judged whether the value of VALID FLAG is set at "0" in all of the records in the step S40. If the judgment is affirmative, the procedure goes to the step S41, whereby a clear operation management table is deleted.

Figure 20:
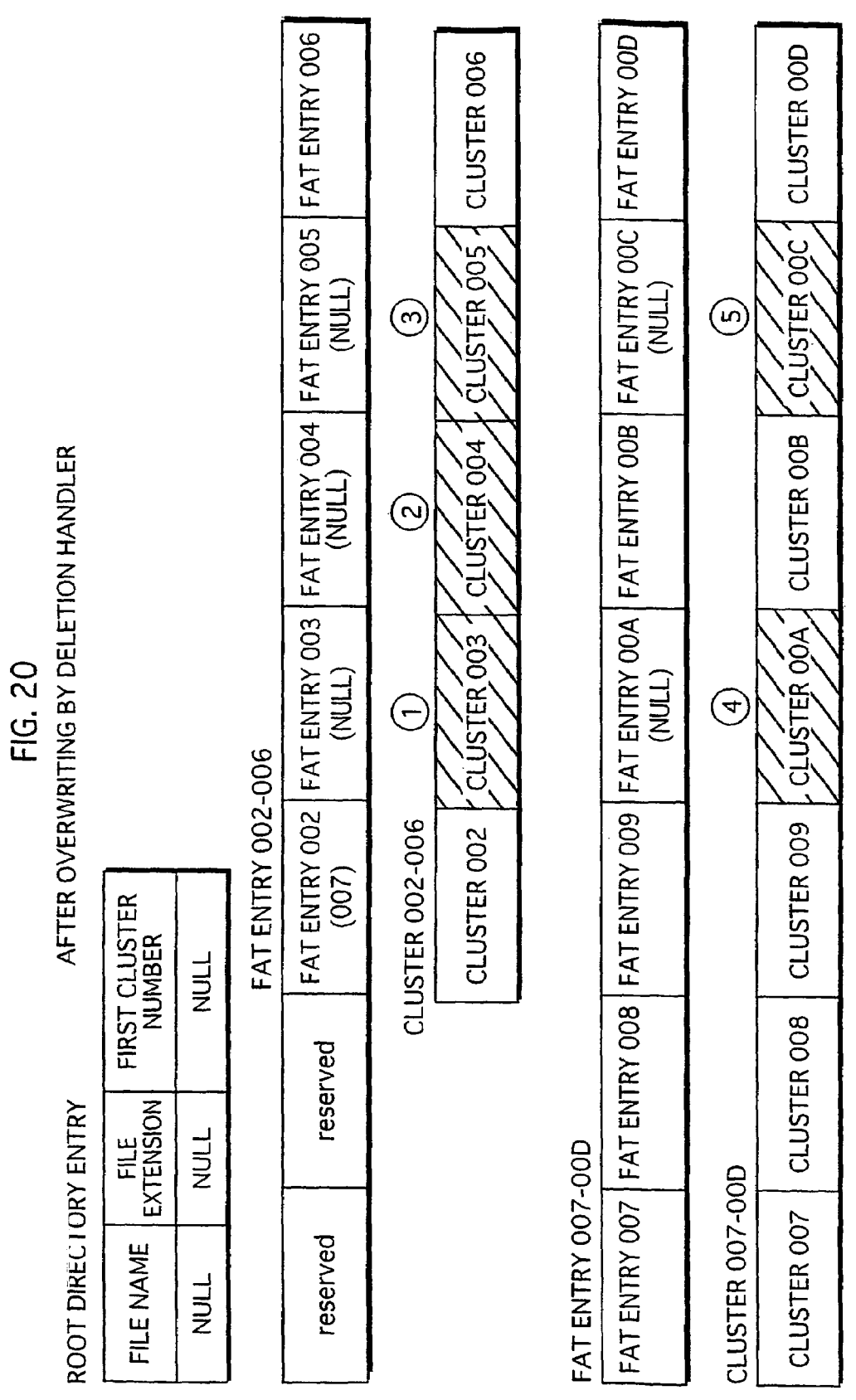

Here, the operations by the not-command-executing handler 12, the reading/writing handler 14 and the deletion handler 16 to delete a file whose file name is EOB001.SE1 stored in a root directory are, as an example, described with reference to FIGS. 20 and 21. FIG. 20 illustrates a root directory entry and a FAT for the file after an operation by the deletion handler 16 in response to a deletion event to the file that is stored as described in FIG. 10. When a deletion event to the file "EOB001.SE1" is generated, a clear operation management table for the fragments of the file is created, and FILE NAME, FILE EXTENSION, and FIRST CLUSTER NUMBER entries of the file entry for the file and FAT entries 003, 004, 005, 00A and 00C are overwritten with null codes. After this overwriting by the deletion handler 16, an operation by the not-command-executing handler 12 starts.

FIG. 21 illustrates the root directory entry and the FAT after the overwriting by the not-command-executing handler 12 and the deletion handler 16. Since the clear operation management table for the fragments of the file has been created by the deletion handler 16, the clusters 003, 004, 005, 00A and 00C storing the fragments have been overwritten with null codes.

As described above, if an EC command issued by the EC client application 8 instructs file deletion, a null-clear operation is continuously performed by the deletion handler 16 until the timer handler 13 tells a time-out. The operation of the deletion handler 16 is terminated in accordance with the occurrence of the time-out. Accordingly, a time period from the issuance of an EC command by the EC client application 8 to the issuance of an EC response by the event analysis handler 11 can be shortened. This enables a processing time required for processing an EC command to be shortened, and thereby does not frustrate a user of the EC client application 8.

Overwriting load of data of the file that has not been null-cleared yet is divided to be performed by event handlers other than the deletion handler 16, such as the not-command-executing handler 12 and the reading/writing handler 14, in a plurality of idle periods. Therefore, overwriting of a file entity can be completed without bothering a user because of a lengthy deletion procedure, even though an overwriting operation to the EEPROM 3 requires a long time and each fragment has a large-sized data.

In addition, an encryption key, which is vital for reading an encrypted file, is null-cleared in the very first place. Therefore, even if a user violently pulls out the SDeX memory card 400 from the SD portable device 300 in the middle of the deletion procedure by the deletion handler 16, the encrypted file is still sufficiently protected.

Second Embodiment

According to the first embodiment, overwriting of a fragment with null codes is performed from a start address towards an end address of the fragment, i.e. in a forward direction. According to a second embodiment, overwriting is not only performed in a forward direction but also in a various different manners.

Figure 22:
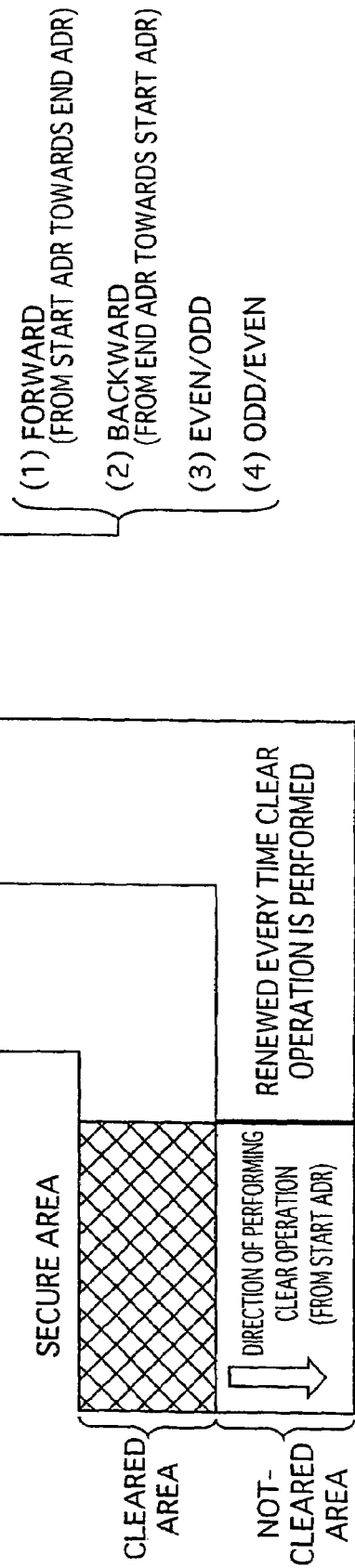
FIG. 22 shows an example of a clear operation management table relating to a second embodiment.

FIG. 22 shows an example of a clear operation management table relating to the second embodiment. As shown in FIG. 22, a record of the table additionally has an entry of CLEAR METHOD.

In the entry CLEAR METHOD, one of FORWARD, BACKWARD, EVEN/ODD and ODD/EVEN is set. When the CLEAR METHOD entry is set at FORWARD, overwriting of a fragment with null codes is orderly performed from a cleared address towards an end address as in the first embodiment. When the CLEAR METHOD entry is set at BACKWARD, overwriting is performed from a cleared address toward a start address.

When the CLEAR METHOD entry is set at EVEN/ODD, data at even-numbered addresses is first null-cleared and then data at odd-numbered addresses is null-cleared from a cleared address toward an end address.

When the CLEAR METHOD entry is set at ODD/EVEN, data at odd-numbered addresses is first null-cleared and then data at even-numbered addresses is null-cleared from a cleared address toward an end address.

A clear method for fragments may be selected in rotation by the deletion handler 16. More specifically, a forward null-clear operation may be selected for the first fragment, a backward null-clear operation for the second, an even/odd null-clear operation for the third, an odd/even null-clear operation for the fourth. Furthermore, forward, backward, even/odd and odd/even null-clear operations may be selected respectively for the fifth and subsequent fragments.

Alternatively, a clear method for fragments may be selected at random. In detail, random numbers from 1 to 4 are generated by the deletion handler 16, and a null-clear operation is performed in a clear method indicated by one of the numbers.

Moreover, a clear method may be determined according to a parameter received from the EC client application 8.

Figure 23:
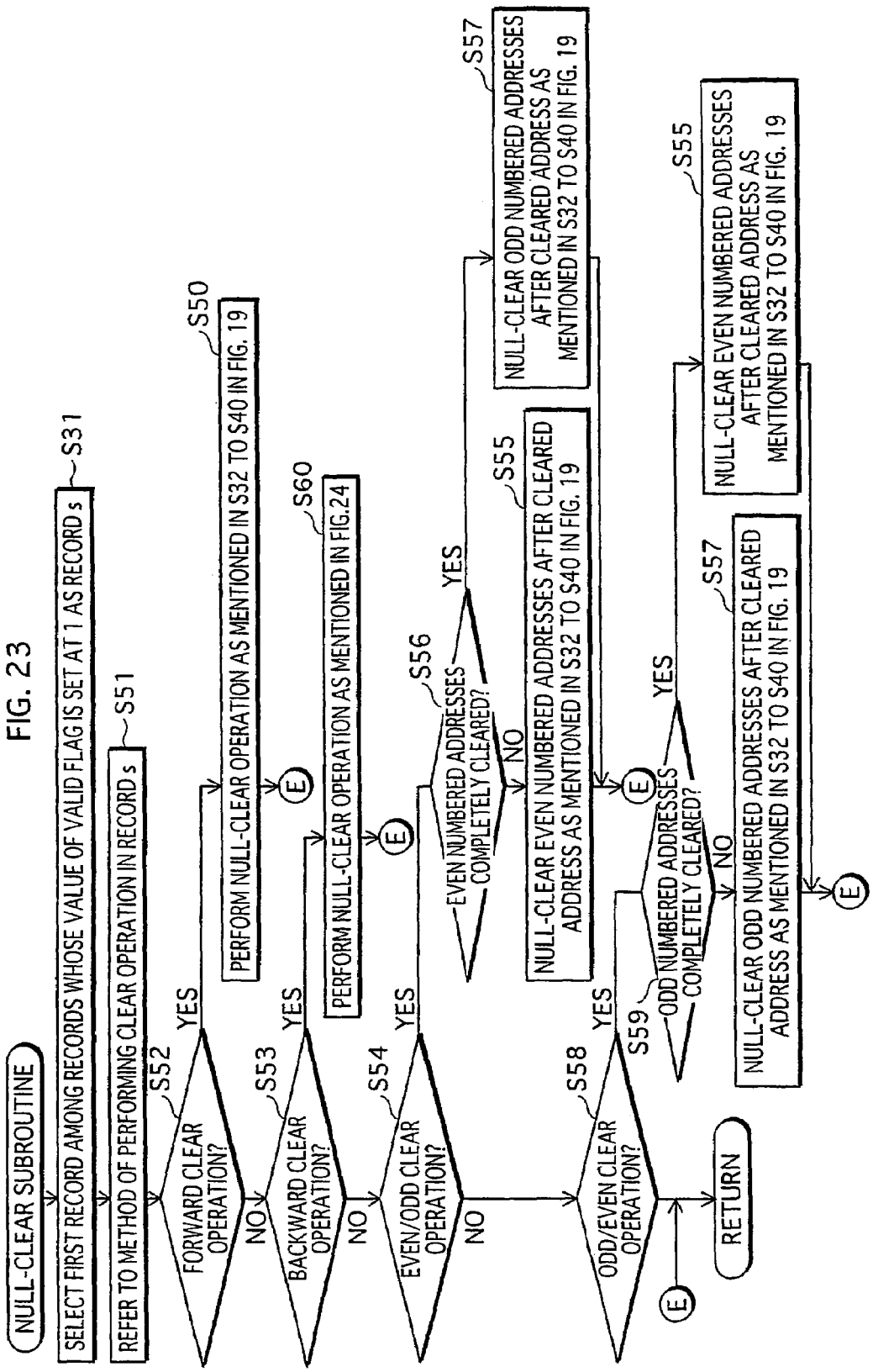
FIG. 23 shows a procedure of a null-clear subroutine relating to the second embodiment.

FIG. 23 shows a procedure of a null-clear subroutine relating to the second embodiment. The first record among records which have a value of VALID FLAG being set at "1" is selected as a record s in the step S31. The CLEAR METHOD entry of the record s is referred to in the step S51. If the CLEAR METHOD entry is set as FORWARD, a null-clear operation is performed in the same procedure as the steps S32 to S40 shown in the flow chart of FIG. 19 in the step 50.

Figure 24:
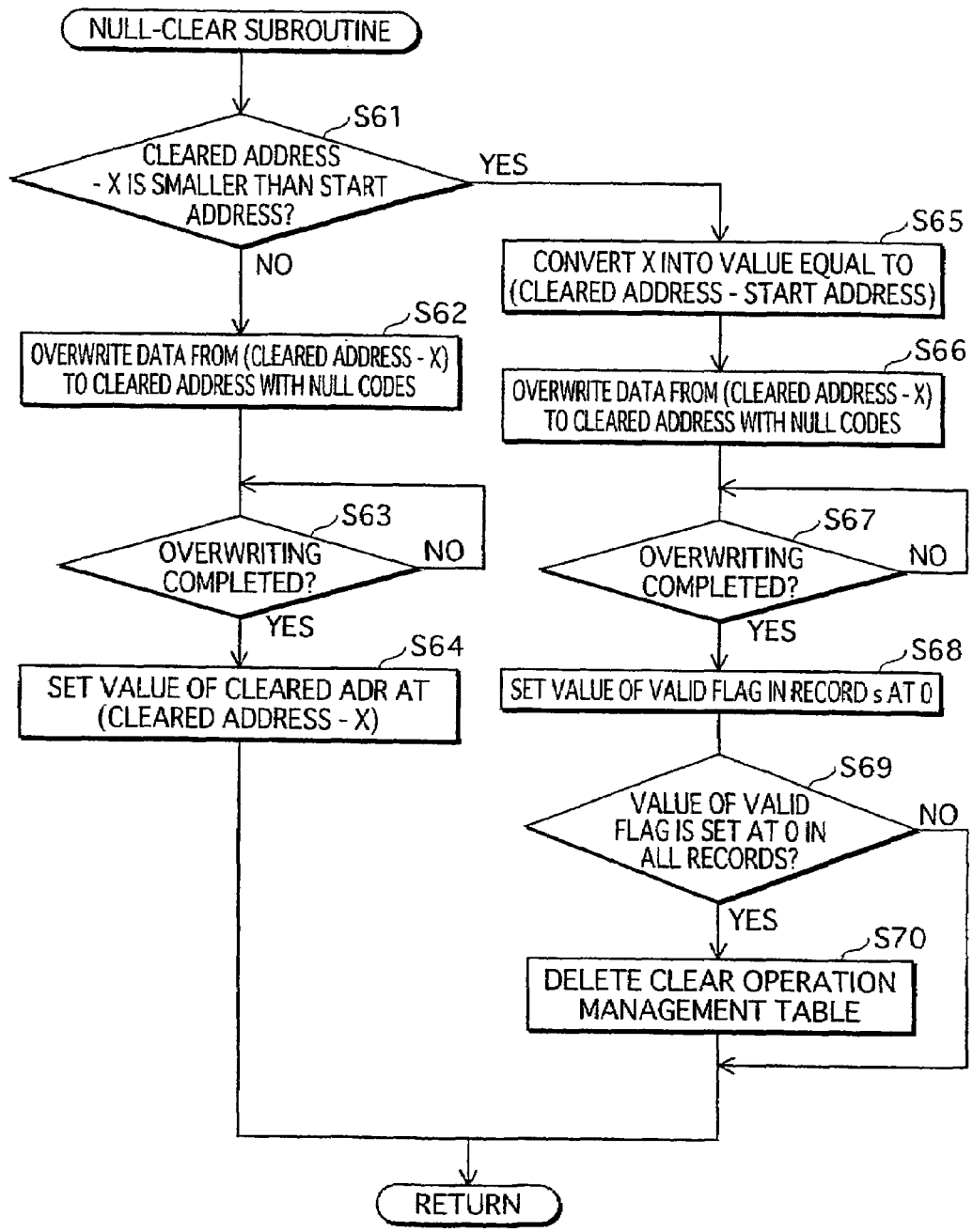
FIG. 24 is a flow chart illustrating a procedure of a backward null-clear operation.

If the CLEAR METHOD entry is set as BACKWARD (the step S53), a null clear operation is performed in the procedure described in the flow chart of FIG. 24 (the step S60).

If the CLEAR METHOD entry is set as EVEN/ODD (the step S54), data at even-numbered addresses after a cleared address is null-cleared (the step S55) in the same procedure as the steps S32 to S40 in the flow chart of FIG. 19. If data at even-numbered addresses is completely null-cleared (the step S56), data at odd-numbered addresses after the cleared address is null-cleared in the step S57 in the same procedure as the steps S32 to S40 in the flow chart of FIG. 19.

If the CLEAR METHOD entry is set as ODD/EVEN (the step S58), data at odd-numbered addresses after a cleared address is null-cleared (the step S57) in the same procedure as the steps S32 to S40 in the flow chart of FIG. 19. If data at odd-numbered addresses is completely null-cleared (the step S59), data at even-numbered addresses after the cleared address is null-cleared in the step S55 in the same procedure as the steps S32 to S40 in the flow chart of FIG. 19.

FIG. 24 is a flow chart illustrating a procedure of a backward null-clear operation. When compared with the null-clear subroutine described in FIG. 19, a relation between a start address and an end address is reversed in the backward null-clear operation. It is judged whether an address obtained by subtracting the overwriting unit length X from a cleared address is larger than a start address of a record s in the step S61. If the judgment is affirmative, the external memory control unit 4 is instructed to overwrite X-byte data from an address (the cleared address-X) of a fragment in the step S62. If overwriting by the external memory control unit 4 is completed (the step S63), the cleared address is renewed to the address of (the cleared address-X) in the step S64.

If an address (the cleared address-the overwriting unit length X) is smaller than a start address of the record s, the unit length X is converted so as to be equal to a value obtained by subtracting the start address from the cleared address (the step S65). Then, the external memory control unit 4 is instructed to overwrite X-byte data from the start address with null codes in the step S66. If the overwriting is completed (the step S67), the value of VALID FLAG of the record s is set at "0" (the step S68). It is judged whether the value of VALID FLAG is set at "0" in all records in the step S69. If the judgment is affirmative, the clear operation management table is deleted in the step S70.

As described above, a different clear method can be assigned to each fragment in the second embodiment. As a consequence, various kinds of clear methods are combined, so that a leakage of contents of fragments to be deleted can be prevented.

Third Embodiment

According to a third embodiment, overwriting with null codes described in the first embodiment is restricted, if a semiconductor memory card is receiving power supply from the card reader/writer 200. When the SDeX memory card 400 gains access to the EC server 100 through the card reader/writer 200, the SDeX memory card 400 receives power supply through a helical antenna in the back surface of the SD portable device 300 as described in the first embodiment. Since radio wave power supply is unstable and small, unnecessary load on the SDeX memory card 400 should preferably be avoided.

According to the third embodiment, the following operations are performed by the SD portable device 300 and the deletion handler 16.

When the SD portable device 300 approaches the card reader/writer 200, it outputs an extended SD command in order to notify that it receives contactless power supply to the SDeX memory card 400. On the other hand, when the SD portable device 300 recedes from the card reader/writer 200, it outputs an extended SD command in order to notify that contactless power supply has been stopped to the SDeX memory card 400. Whether the SD portable device 300 approaches or recedes from the card reader/writer 200 is determined by whether the SD portable device 300 receives a polling command from the card reader/writer 200.

When an extended SD command to notify the existence of contactless power supply is received from the SD portable device 300, the deletion handler 16 enters into a contactless-power-supply mode. If the deletion handler 16 is in this mode, a backup copy of a file entry and a FAT is generated and only a file entry and a FAT are overwritten in accordance with the generation of a deletion event. That is to say, only a backup copy of a file entry and a FAT is generated and no clear operation management table is created. Thus, a null-clear operation is not performed by other event handlers.

When an extended SD command to notify that contactless power supply has been stopped is issued by the SD portable device 300 afterwards, the deletion handler 16 exits from the contactless-power-supply mode and a clear operation management table is created based on the backup copy of a file entry and a FAT. Because of the generation of the clear operation management table, a null-clear operation by event handlers other than the deletion handler 16 is started.

According to the third embodiment, a null-clear operation to a file entity of a file is not performed if the SDeX memory card 400 is operated by power supply from the card reader/writer 200 as described above. Therefore, unnecessary load is not put on the SDeX memory card 400. This enables a stable operation of the SDeX memory card 400 to be realized.

Fourth Embodiment

Figure 25:
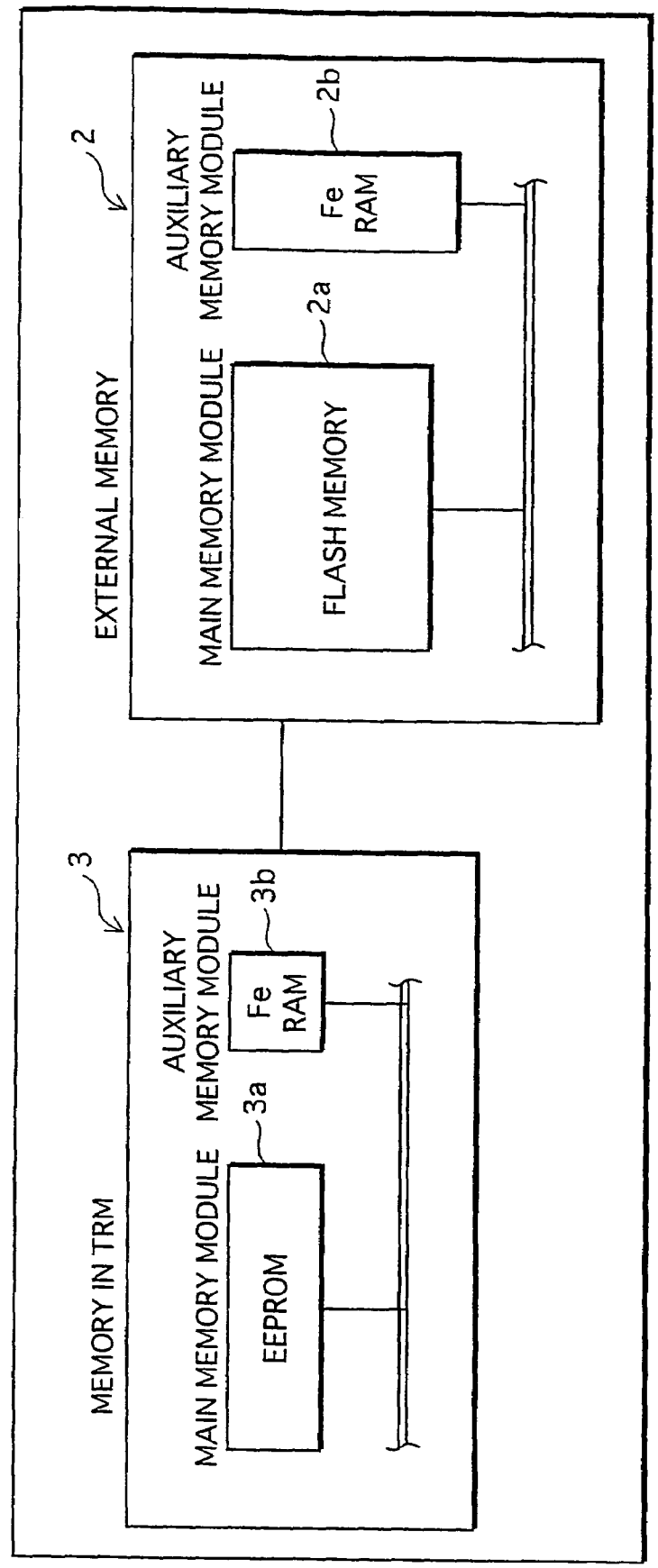
FIG. 25 shows a structure of a memory module relating to a fourth embodiment.

In the first, second and third embodiments, the memory 3 in the TRM 1 and the external memory 2 are constituted by an EEPROM and a flash memory respectively. According to a fourth embodiment, however, the memory 3 in the TRM 1 and the external memory 2 are each constituted by two memory modules. FIG. 25 illustrates the structure of each of the internal memory 3 and the external memory 2 relating to the fourth embodiment. As shown in FIG. 25, an EEPROM 3a and a flash memory 2a are main memory modules and respectively the same as the EEPROM 3 and the flash memory 2 in the first to sixth embodiments. In addition to these main memory modules, auxiliary memory modules 2b and 3b are provided for the external memory 2 and the internal memory 3 respectively in the fourth embodiment. These auxiliary memory modules 2b and 3b are Ferro Electric Random Access Memories (FeRAMs) and their performance is significantly different from that of a flash memory. FIG. 26 compares performance of a flash memory and that of an FeRAM. According to FIG. 26, a flash memory is inexpensive and suitable for storing large-capacity data (indicated by ○ in the figure). However, the unit of data writing is a block (indicated by ※1). Here, the size of such a block increases as the capacity of a flash memory increases. Accordingly, writing of small-sized data means large loss of capability. In addition, the time required for writing is long (10,000 ns) and the number of possible write operations is small (1,000,000). Furthermore, data writing is only performed after data that has been stored is once deleted, which makes the writing performance unstable (indicated by ※2).

On the other hand, though an FeRAM is expensive and not suitable for storing large-capacity data (indicated by Δ), the unit of data writing is a byte and a time required for writing is short (30 to 100 ns). In addition, the number of possible write operations is large.

Considering such a difference in performance, if an FeRAM is used as an auxiliary memory module storing a file entry, a FAT and the like that are frequently renewed, writing performance of the flash memory 2a can be compensated. FIG. 27 shows an FeRAM storing frequently-renewed data such as a file entry, an FAT and a clear operation management table.

According to the fourth embodiment, an FeRAM is used as an auxiliary memory module for storing small-sized and frequently-renewed data such as a file entry and a FAT. This enables a high-speed rewrite operation to a file entry and a FAT to be achieved.

An FeRAM has a property of destructive read out (indicated by ※4). That is to say, once stored data is read out, the contents of the stored data is deleted from a storage medium. This property is preferred to thoroughly ensure secrecy. According to this property, however, every data readout requires writing the read data again, which increases the number of times data is written after all. A magnetoresistive RAM should preferably be employed to avoid the property of destructive read out.

Fifth Embodiment

Figure 28:
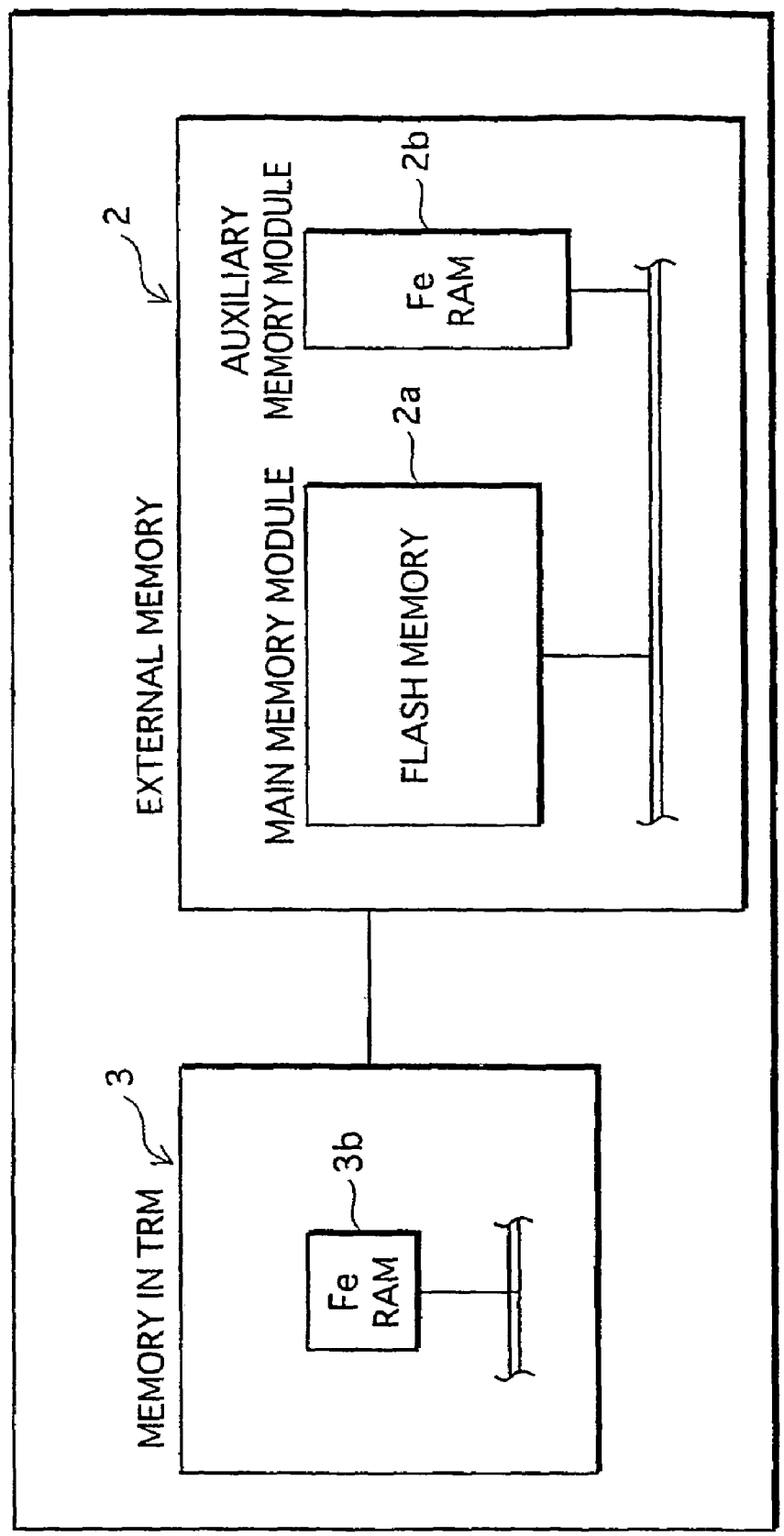
FIG. 28 shows a structure of the memory 3 in the TRM 1 relating to a fifth embodiment.

An FeRAM is used as an auxiliary memory module in the fourth embodiment. In a fifth embodiment, however, only an FeRAM is used for the memory 3 in the TRM 1. FIG. 28 shows an internal structure of the internal memory 3 relating to the fifth embodiment. Here, the memory 3 in the TRM 1 is small-sized. Therefore, the manufacturing cost for the memory 3 does not dramatically increase, even if an FeRAM is used for the internal memory 3. The memory 3 in the TRM 1 is constituted only by an FeRAM in the fifth embodiment, but it should be noted that it may be constituted only by an MRAM.

Sixth Embodiment

According to a sixth embodiment, management information for a file is encrypted with a key that is different from an encryption key for a file entity of the file. Such an encryption key for file management information is stored in the memory 3 in the TRM 1. When file deletion is instructed, overwriting of an encryption key for file management information is performed by the deletion handler 16 in addition to the procedure described in the first embodiment, prior to overwriting of an encryption key for a file entity.

Management information for a file is encrypted with a different encryption key. Thus, when deletion of a file is instructed, reading of the file can be immediately made impossible despite the size of management information.

Modification Examples

The above description does not mention all of the embodiments of the present invention. The present invention can be realized by embodiments including the following modifications (A) to (E). However, the following modifications do not include embodiments of inventions disclosed in the claims, if they can be anticipated by a person with an ordinary skill in the art based on the description, the attached figures and publicly-known technology at the time of the application.

(A) An EC client application is taken as an example, but the present invention may be applied to other applications. For instance, the present invention may be applied to server applications on a server apparatus owned by transportation industry such as railway, airline, bus and expressway companies and corresponding client applications. Thus, the SDeX memory card 400 can be utilized at railway ticket gates and for boarding procedure.

Alternatively, the present invention can be applied to server applications on a server apparatus owned by governmental and local organizations and corresponding client applications. Thus, the SDeX memory card 400 can be utilized for resident's cards, various kinds of proves and registrations.

(B) Information processing by programs illustrated in FIGS. 15 to 19, 23, 24 is physically realized by means of hardware resources such as a CPU and an EEPROM. That is to say, a physical unit obtained by combining programs and hardware resources performs information processing to achieve a particular purpose. In this way, the SDeX memory card 400 described in each of the first to sixth embodiments can be realized.

Information processing by programs is physically realized by means of hardware resources. Accordingly, the programs whose procedures are shown in the above-mentioned figures can be considered products of technical ideas utilizing natural laws, and programs themselves can be regarded as an invention. Therefore, FIGS. 15 to 19, 23 and 24 disclose embodiments of the programs according to the present invention.

The first to sixth embodiments describe the embodiments of the exploitation of the programs according to the present invention, where the programs are integrated into the SDeX memory card 400. However, the programs illustrated in the first to sixth embodiments may be separated from the SDeX memory card 400 for exploitation. Here, the exploitation of the programs themselves indicates the acts of (1) producing the programs, (2) assigning the programs for free or profit, (3) leasing the programs, (4) importing the programs, (5) providing the programs for the public via two-way electronic communication lines and (6) offering assignment or lease of the programs to public users by advertising the programs in the shopwindow and through distribution of pamphlets and catalogues.

A typical example of the act of providing the programs via two-way electronic communication lines (5) is program download service, whereby a provider sends the programs to a user so as that the user can use the programs, and application service provider (ASP) service, whereby the functions of the programs are provided for users via electronic communication lines but the programs themselves are kept by the provider.

(C) A temporal order of a procedure, such as the order of the steps in each of the flow charts in FIGS. 15 to 19, 23, and 24, is considered to be a fundamental matter to specify an invention. Accordingly, the procedure shown in each of the above flow charts discloses how a control method is used. Therefore, these flow charts show embodiments of the use of the control method according to the present invention. If the steps in each flow chart are executed in the described temporal order so as to achieve the original object and effects of the present invention, the procedures in these flow charts are undoubtedly embodiments of the control method for the semiconductor memory card according to the present invention.

(D) In the first to sixth embodiments, an EEPROM is used for the nonvolatile memories both inside and outside the TRM 1. However, the internal and external memories may be other nonvolatile memories such as an FeRAM.

(E) A mobile-telephone type is taken as an example of the SD portable device 300. However, the SD portable device may be a consumer portable audio equipment, a set top box (STB) or a mobile telephone.

The inventions defined in the claims of the present invention extend or generalize the embodiments described in the above and their modifications. The degree of the extension and generalization is based on the state of the art in the related art at the time of the application.

However, since the inventions defined in the claims are based on the means to solve the technical problems in the related art, the scope of each of the inventions does not depart from the scope of the related art realized by a person with ordinary skills in the related art. Therefore, each of the inventions defined in the present claims substantively correspond to the disclosure in the description.

INDUSTRIAL APPLICABILITY

The semiconductor memory card according to the present invention provides high protection for deleted files, and is therefore ideal for storing confidential data. Thus, the semiconductor memory card according to the present invention can be utilized in various fields of the industrial world such as a field of consumer equipments.

Description of Characters
 1 TRM
 2 an external EEPROM
 3 an internal EEPROM
 4 an external memory control unit
 5 a HIM
 6 a mask ROM
 7 a CPU
 8 a client application
 9 a virtual machine
 10 an API
 11 an event analysis handler
 12 a not-command-executing handler
 13 a timer handler
 14 a reading/writing handler
 15 a deletion handler
 21 an area for an application program
 22 a secure area
 23 an authentication area
 24 a non-authentication area
 100 an EC server
 200 a card reader/writer
 210 a radio base station
 300 a portable device

The invention claimed is:

1. A semiconductor memory card comprising:
a nonvolatile memory that stores a file constituted by an entity and management information; and
a tamper-resistant module that includes a processing unit and an internal memory, the processing unit including:
an analysis unit operable to analyze a command issued by a device to which the semiconductor memory card is connected and generate an event corresponding to a result of the analysis; and
a deletion unit operable to, if a deletion event for the file is generated, (i) create a location table on the internal memory in the tamper-resistant module, and (ii) overwrite the management information, wherein
the location table indicates a location of the entity, and is referred to by the deletion unit when the deletion unit overwrites the entity,
the internal memory stores an encryption key with which the entity has been encrypted, and
the deletion unit includes:
a main deletion unit operable to, if the deletion event is generated, first overwrite the encryption key with which the entity has been encrypted and subsequently create the location table and overwrite the management information; and
a sub deletion unit operable to, if an event different from the deletion event is generated, overwrite the entity with reference to the created location table.

2. The semiconductor memory card of claim 1, wherein the deletion event is generated by the analysis unit when the device to which the semiconductor memory card is connected issues a command to delete the file, and
the different event is a command-end event that is generated by the analysis unit when the processing unit completes the operation corresponding to the command.

3. The semiconductor memory card of claim 1, wherein the deletion event is generated by the analysis unit when the device to which the semiconductor memory card is connected issues a command to delete the file, and
the different event is one of a reading event and a writing event, the reading event being generated by the analysis unit when the device issues a command to read a different file in the semiconductor memory card, and the writing event being generated by the analysis unit when the device issues a command to write to the different file in the semiconductor memory card.

4. The semiconductor memory card of claim 3, wherein the main deletion unit is a deletion handler that starts operating in response to the generation of the deletion event, and the sub deletion unit is included in a reading/writing handler that starts operating in response to the generation of one of the reading event and the writing event.

5. The semiconductor memory card of claim 1, wherein
the management information of the file has been encrypted with an encryption key which is different from the encryption key for the entity, the encryption key for the management information being stored in the internal memory, and when the deletion event is generated, the main deletion unit overwrites the encryption key for the management information before overwriting the encryption key for the entity.

6. The semiconductor memory card of claim 1, wherein
the entity of the file is divided into fragments, and
the location table shows (i) a start address of each of the fragments constituting the entity, and (ii) a flag which is set as "OFF" if each of the fragments has not been completely overwritten and set as "ON" if the fragment has been completely overwritten.

7. The semiconductor memory card of claim 1, wherein
the semiconductor memory card operates by means of either contact or contactless power supply from a device, and the processing unit performs the overwriting only when the semiconductor memory card operates by means of the contact power supply from the device.

8. The semiconductor memory card of claim 1 wherein
the nonvolatile memory is constituted by a first memory module and a second memory module,
a unit of writing for the second memory module is smaller than a unit of writing for the first memory module, and
the management information is stored in the second memory module.

9. The semiconductor memory card of claim 8, wherein
the second memory module is one of a Ferro Electric Random Access Memory and a Magnetoresistant Random Access Memory.

10. The semiconductor memory card of claim 1, wherein
the internal memory is constituted by a first memory module and a second memory module,
a unit of writing for the second memory module is smaller than a unit of writing for the first memory module, and
the location table is stored in the second memory module.

11. The semiconductor memory card of claim 10, wherein
the second memory module is one of a Ferro Electric Random Access Memory and a Magnetoresistant Random Access Memory.

12. A control program embodied on a computer-readable medium, the control program being executed by a CPU in a tamper-resistant module included in a semiconductor memory card, the tamper-resistant module including an internal memory, and the semiconductor memory card including a nonvolatile memory for storing a file constituted by an entity and management information, the control program causing the CPU to execute:

an analysis step of analyzing a command issued by a device to which the semiconductor memory card is connected and generating an event corresponding to a result of the analysis; and a deletion step of, if a deletion event for the file is generated, (i) creating a location table on the internal memory in the tamper-resistant module, and (ii) overwriting the management information, wherein the location table indicates a location of the entity, and is referred to by the control program when the control program overwrites the entity, the internal memory stores an encryption key with which the entity has been encrypted, the deletion step includes:

a main deletion step of, if the deletion event is generated, first overwriting the encryntion key with which the entity has been encrypted and subsequently creating the location table and overwriting the management information; and a sub deletion step of, if an event different from the deletion event is generated, overwriting the entity with reference to the created location table.

* * * * *

UNITED STATES PATENT AND TRADEMARK OFFICE
CERTIFICATE OF CORRECTION

| | | |
|---|---|---|
| PATENT NO. | : 7,303,135 B2 | Page 1 of 1 |
| APPLICATION NO. | : 10/512149 | |
| DATED | : December 4, 2007 | |
| INVENTOR(S) | : Futoshi Nakabe et al. | |

It is certified that error appears in the above-identified patent and that said Letters Patent is hereby corrected as shown below:

<u>Column 20,</u>

Line 46, "wben" should read --when--.

<u>Column 21,</u>

Line 28, "claim 1 wherein" should read --claim 1, wherein--.

<u>Column 22,</u>

Line 29, "encrypted," should read --encrypted, and--;
Line 32, "encyntion" should read --encryption--.

Signed and Sealed this

Twentieth Day of May, 2008

JON W. DUDAS
*Director of the United States Patent and Trademark Office*